(12) United States Patent
Raak et al.

(10) Patent No.: US 12,246,443 B2
(45) Date of Patent: Mar. 11, 2025

(54) ARM JOINT FOR A MANIPULATOR AND MANIPULATOR

(71) Applicant: igus GmbH, Cologne (DE)

(72) Inventors: Martin Raak, Cologne (DE); Felix Berger, Cologne (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 18/405,264

(22) Filed: Jan. 5, 2024

(65) Prior Publication Data
US 2024/0149437 A1 May 9, 2024

Related U.S. Application Data

(63) Continuation of application No. 16/980,557, filed as application No. PCT/EP2019/054305 on Feb. 21, 2019, now Pat. No. 11,865,712.

(30) Foreign Application Priority Data

Mar. 15, 2018 (DE) ...................... 20 2018 101 462.5

(51) Int. Cl.
B25J 9/08 (2006.01)
B25J 9/10 (2006.01)
(Continued)

(52) U.S. Cl.
CPC ................. *B25J 9/08* (2013.01); *B25J 9/102* (2013.01); *B25J 9/103* (2013.01); *F16H 1/16* (2013.01);
(Continued)

(58) Field of Classification Search
CPC .......... F16C 23/10; F16H 1/16; F16H 57/039; F16H 57/022; F16H 57/12;
(Continued)

(56) References Cited

U.S. PATENT DOCUMENTS 3,215,391 A 11/1965 Storm
4,310,958 A 1/1982 Balaud et al.
(Continued)

FOREIGN PATENT DOCUMENTS

CN 1871102 11/2006
CN 201934582 8/2011
(Continued)

OTHER PUBLICATIONS

English translation of the International Search Report from corresponding PCT Appln. No. PCT/EP2019/054305, dated Jun. 24, 2019.
(Continued)

*Primary Examiner* — T. Scott Fix
(74) *Attorney, Agent, or Firm* — Grossman, Tucker, Perreault & Pfleger, PLLC

(57) ABSTRACT

An arm joint for a manipulator having a motor with a transmission, comprising a gear wheel that can rotate about a transmission axis of rotation, wherein the gear wheel is rotatably mounted in a housing of the arm joint and has an adapter on at least one of its end sides, and wherein the adapter has an opening that is central relative to the transmission axis of rotation on the side facing away from the end side of the gear wheel The central opening has an internal thread for the purpose of a simple construction, easy assembly and a great number of variation possibilities in terms of construction and application.

19 Claims, 13 Drawing Sheets

(51) Int. Cl.
*F16H 1/16* (2006.01)
*F16H 57/12* (2006.01)
*B25J 17/02* (2006.01)
*F16H 55/24* (2006.01)

(52) U.S. Cl.
CPC .......... *F16H 57/12* (2013.01); *B25J 17/0241* (2013.01); *B25J 17/025* (2013.01); *F16H 55/24* (2013.01)

(58) Field of Classification Search
CPC ..... F16H 2057/0225; F16H 2057/0221; F16H 2057/0213; F16H 2057/02021; F16H 2057/126; F16H 2057/127; F16H 55/18; B25J 9/08; B25J 9/102; B25J 9/103
See application file for complete search history.

(56) References Cited

U.S. PATENT DOCUMENTS

| | | |
|---|---|---|
| 4,552,504 A | 11/1985 | Nakada et al. |
| 7,849,761 B2 | 12/2010 | Forslund |
| 8,646,351 B2 | 2/2014 | Fuechsel et al. |
| 2012/0011956 A1 | 1/2012 | Lundberg |
| 2015/0300479 A1 | 10/2015 | Frank |
| 2017/0100844 A1 | 4/2017 | Raak et al. |
| 2018/0266535 A1 | 9/2018 | Uhlenbrok et al. |
| 2019/0004261 A1 | 1/2019 | Koch |
| 2019/0084149 A1 | 3/2019 | Raak et al. |

FOREIGN PATENT DOCUMENTS

| | | | |
|---|---|---|---|
| CN | 102770327 | 11/2012 | |
| CN | 104870860 | 8/2015 | |
| CN | 105264263 | 1/2016 | |
| CN | 107175683 | 9/2017 | |
| DE | 2852502 | 6/1979 | |
| DE | 3804861 | 8/1989 | |
| DE | 202014101342 | 5/2014 | |
| DE | 202016101255 | 5/2016 | |
| DE | 102016101255 | 7/2017 | |
| EP | 0527121 | 2/1993 | |
| EP | 1983224 | 10/2008 | |
| GB | 156972 A * | 1/1921 | ................ B60J 1/04 |
| GB | 2481249 | 12/2011 | |
| JP | S59173582 | 11/1984 | |
| JP | S6140548 | 3/1986 | |
| JP | S58211892 | 12/1993 | |
| JP | 2017-087374 | 5/2017 | |
| KR | 2020120007804 | 11/2012 | |

OTHER PUBLICATIONS

English translation of the International Preliminary Report on Patentability from corresponding PCT Appln. No. PCT/EP2019/054305, dated Sep. 15, 2020.

Igus Gmbh. "Robolink Baukasten—Komponenten fi.ir Low-Cost-Roboter", May 9, 2017 (May 9, 2017), Retrieved from the Internet: https://www.igus.de/contentData/Product_Files/Download/pdf/DE_robolink_2017 2.pdf, [retrieved on Jun. 13, 2019], XP055596168.

Office Action from related Korean Appln. No. 10-2020-7029680, dated Mar. 21, 2022. English translation attached.

Office Action from related Japanese Appln. No. 2020-549005, dated Jan. 11, 2022. English translation attached.

* cited by examiner

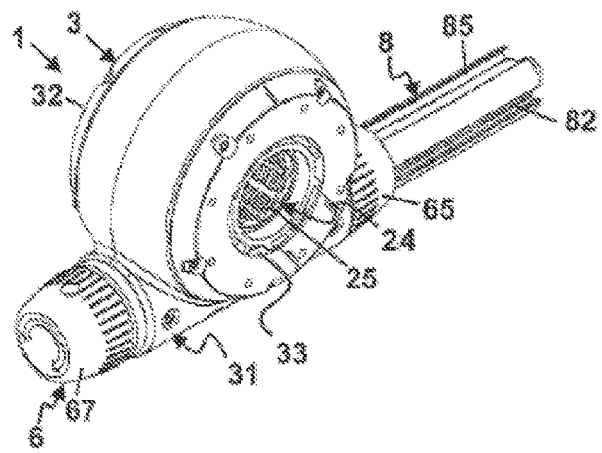
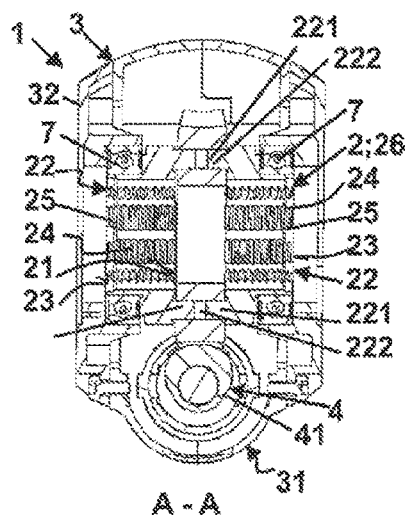
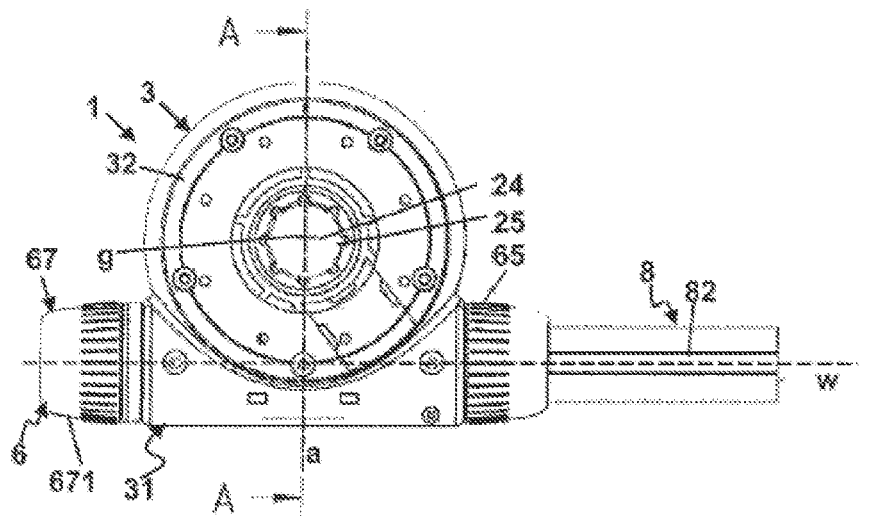
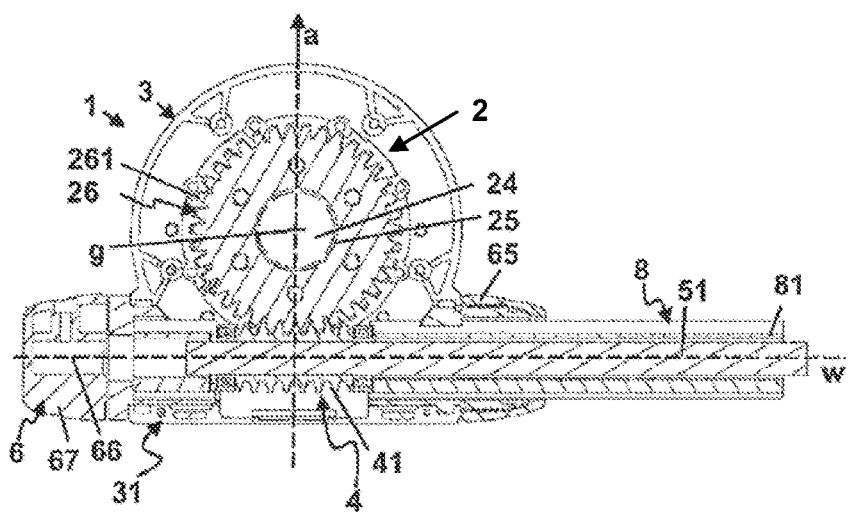

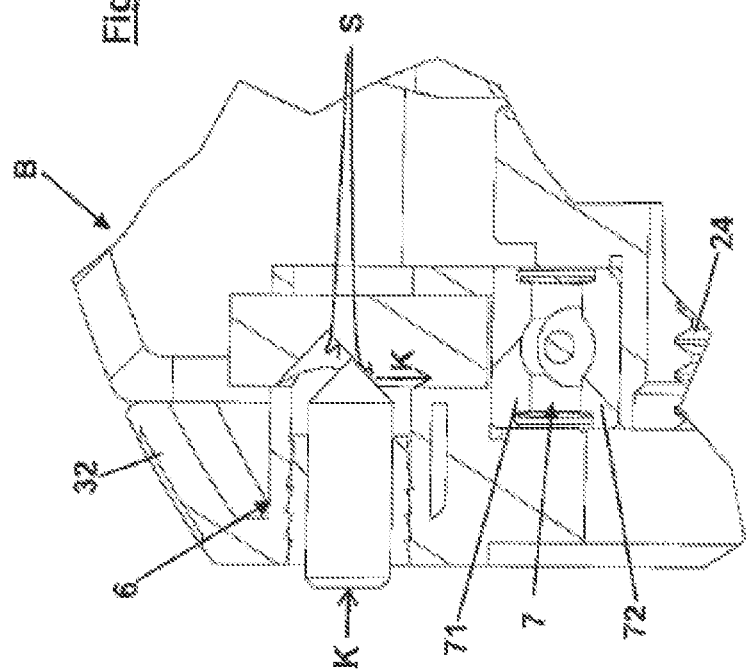
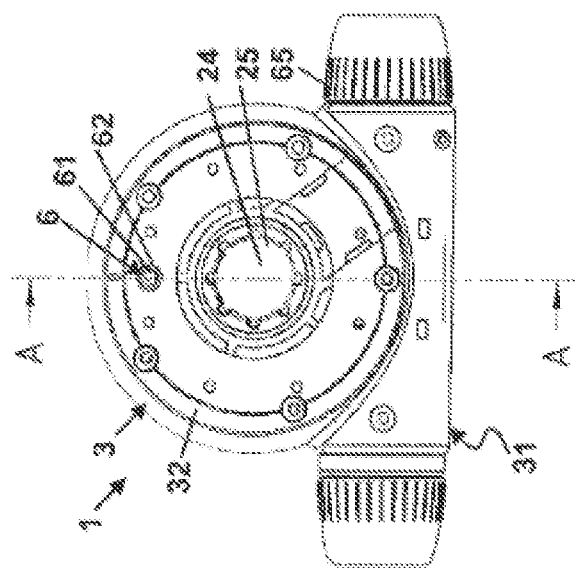
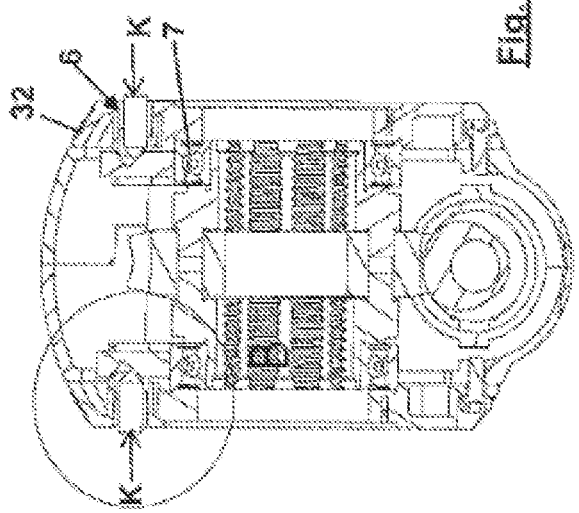

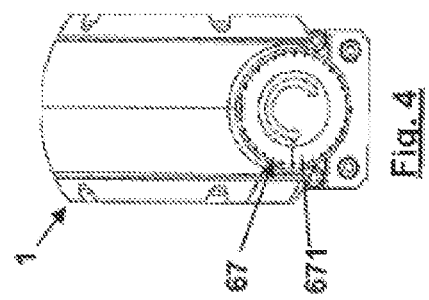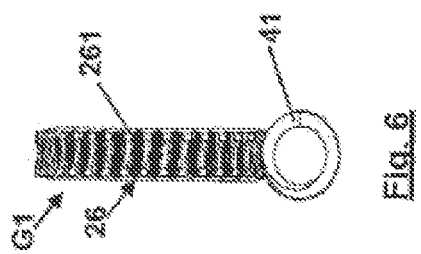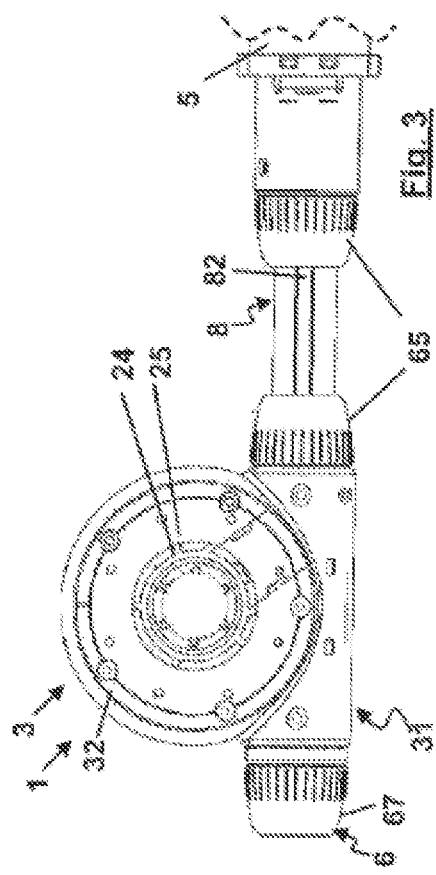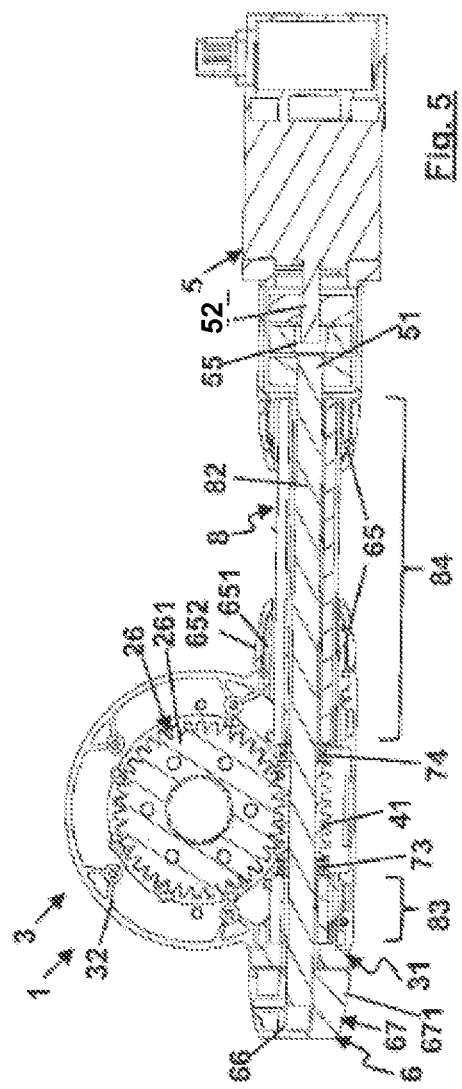

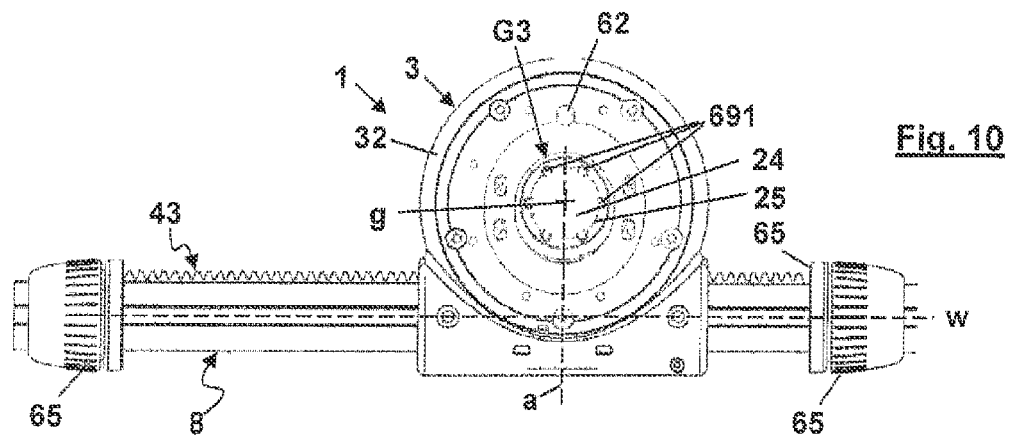
Fig. 10
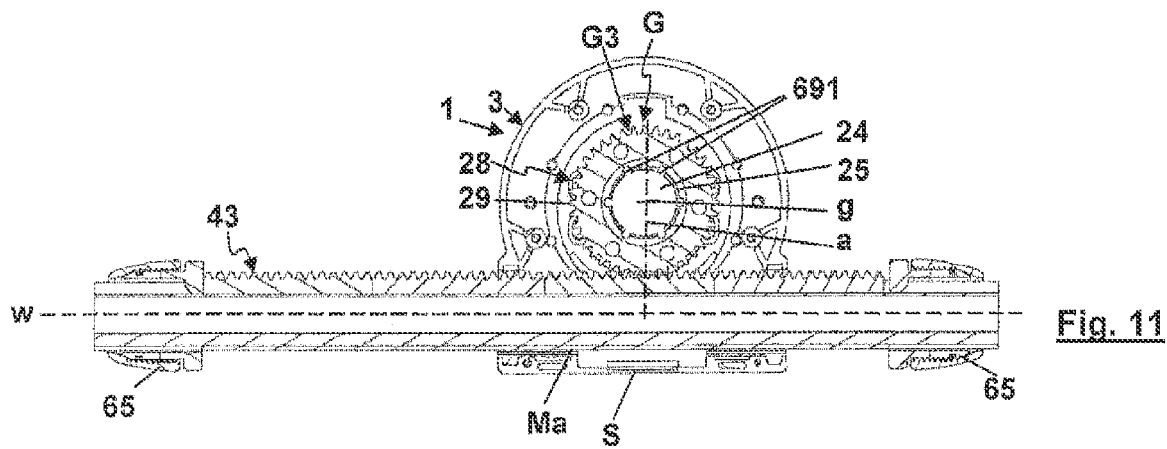
Fig. 11
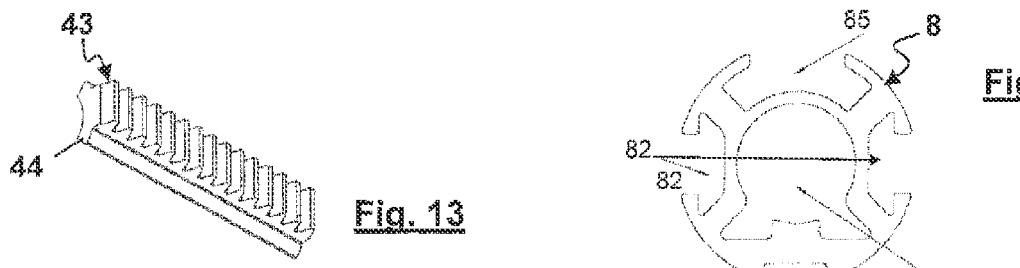
Fig. 13
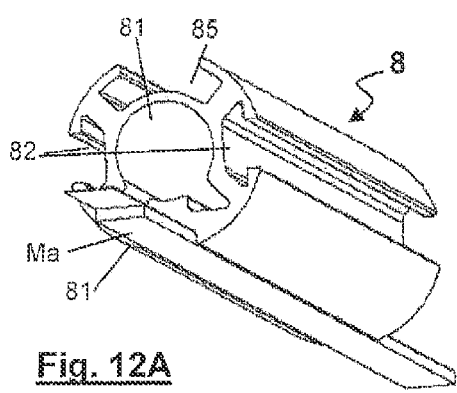
Fig. 12A
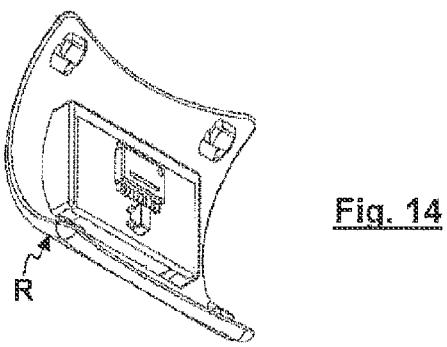
Fig. 12B
Fig. 14

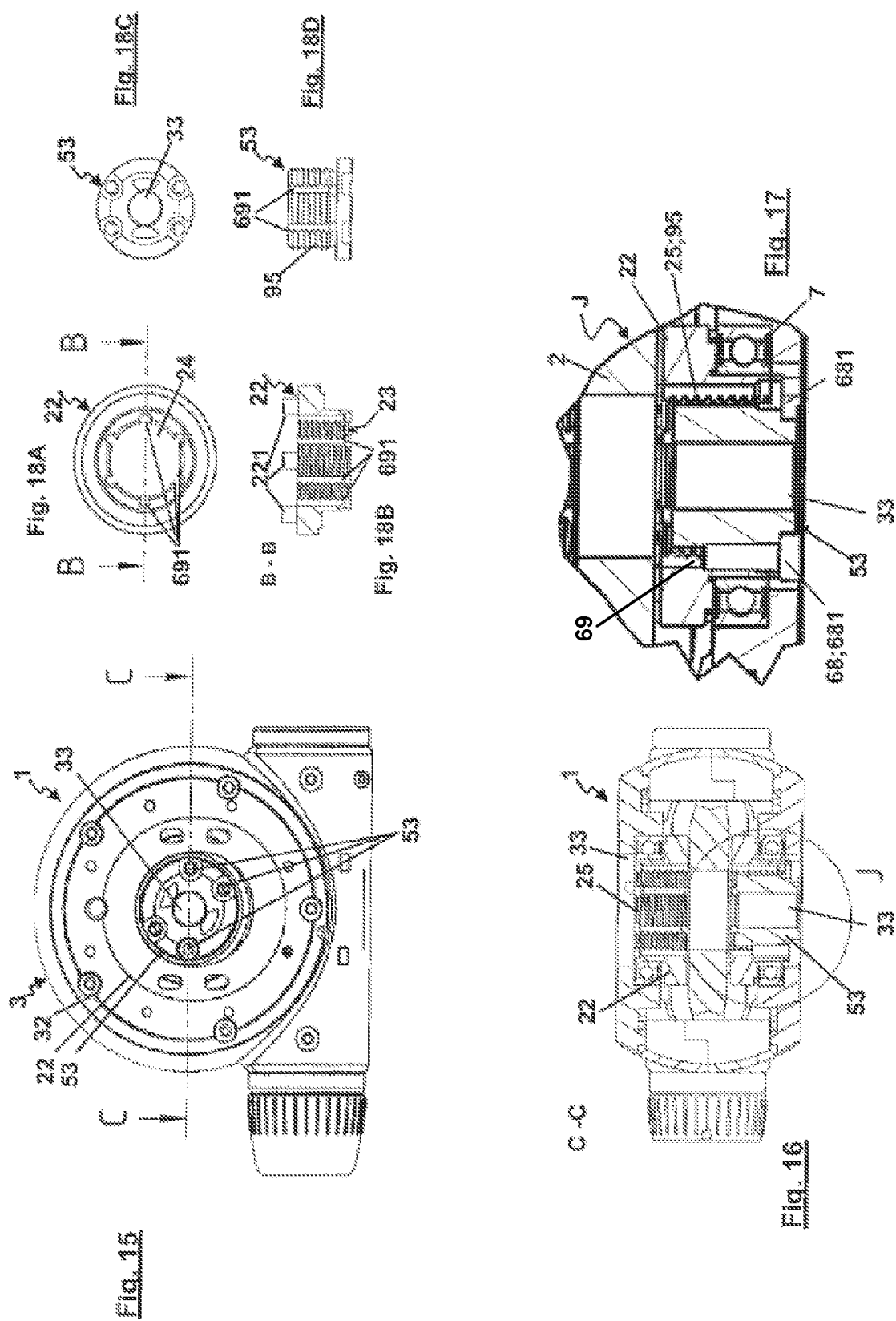

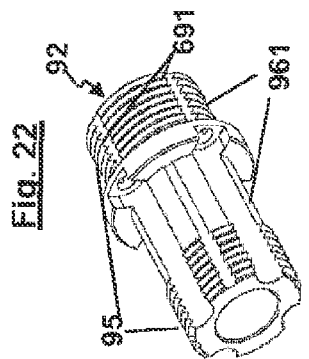
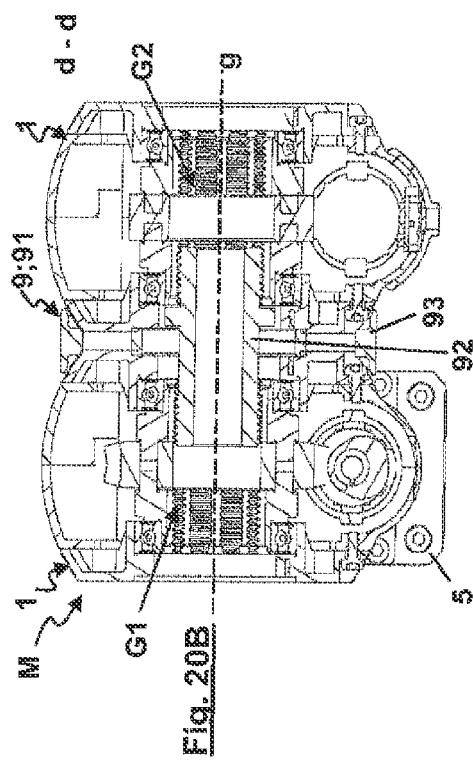
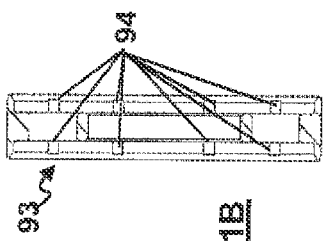
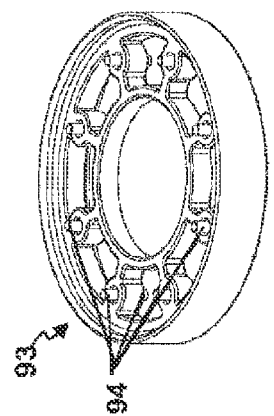
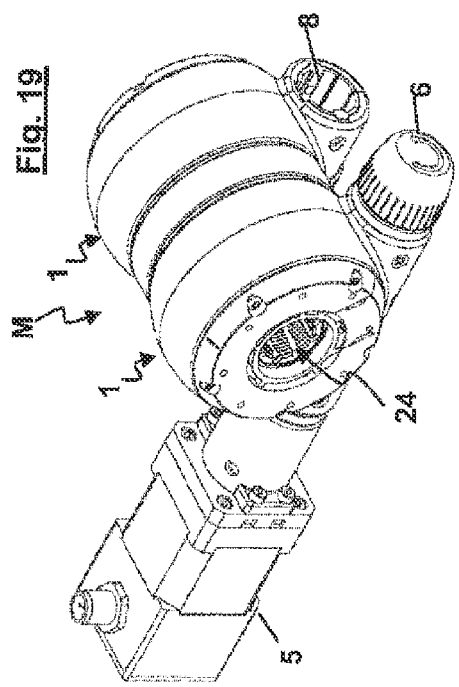
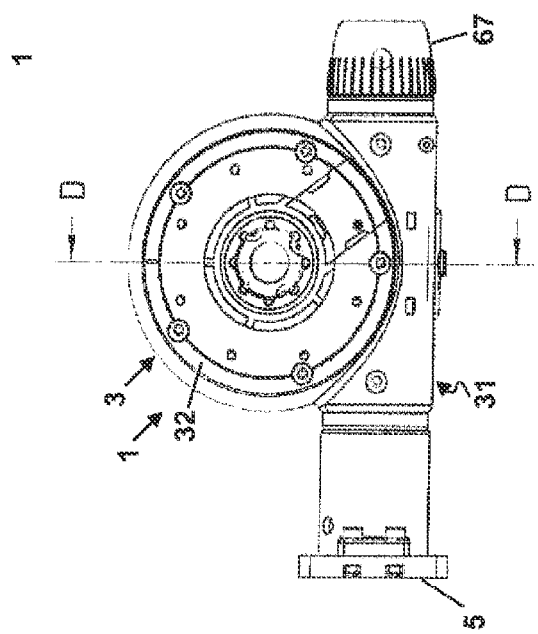

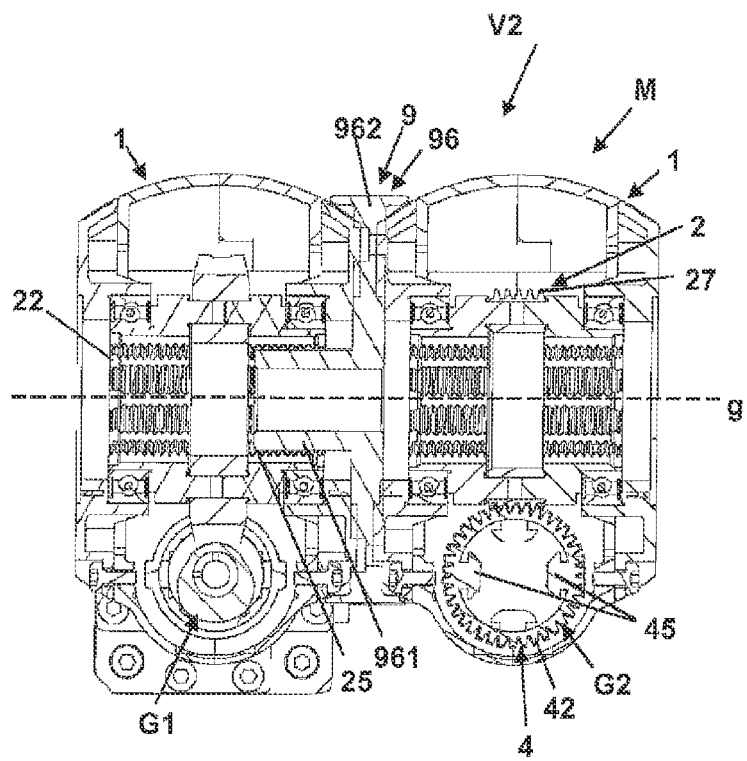
Fig. 23
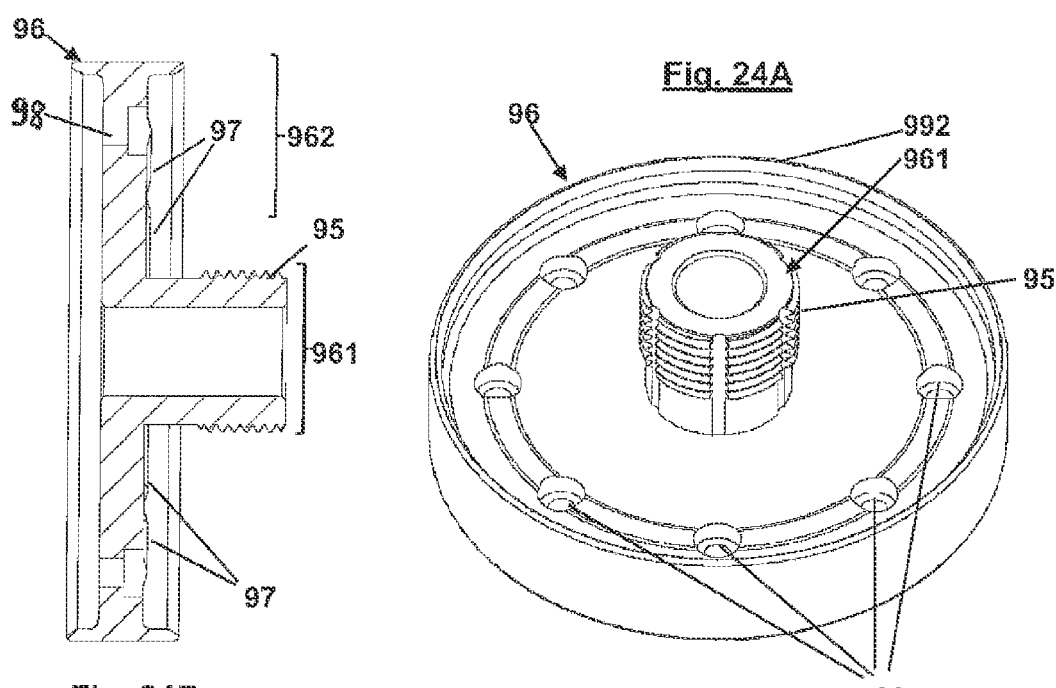
Fig. 24A
Fig. 24B

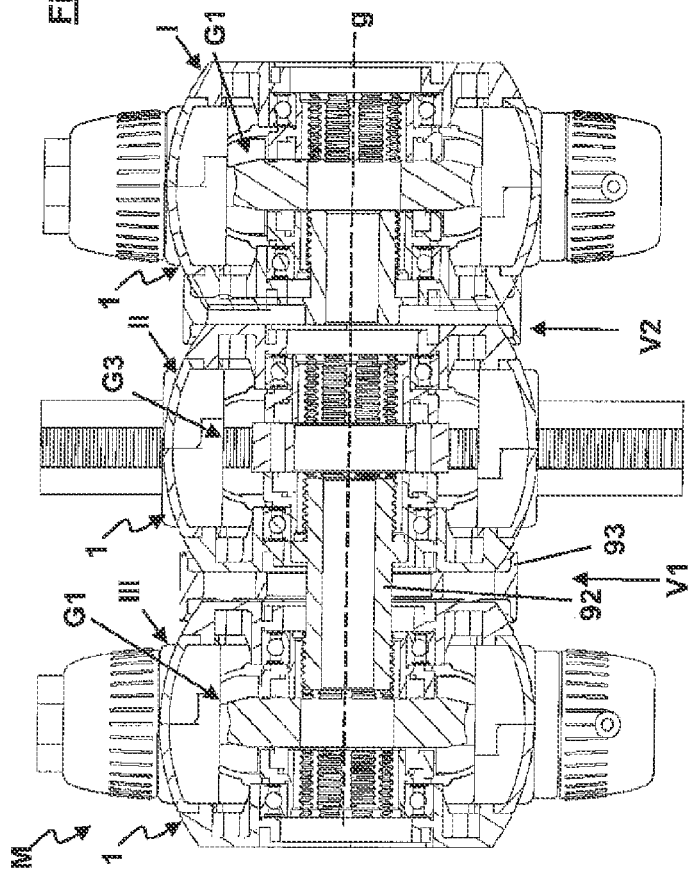

ARM JOINT FOR A MANIPULATOR AND MANIPULATOR

CROSS-REFERENCE TO RELATED APPLICATIONS

This application is a continuation application of U.S. non-provisional patent application Ser. No. 16/980,557, filed Sep. 14, 2020, now pending, which is a U.S. national stage (371) application of PCT application serial no. PCT/EP2019/054305 filed Feb. 21, 2019, which claims priority to German patent application serial no. 20 2018 101 462.5, filed Mar. 15, 2018, which are all incorporated by reference herein.

FIELD

The invention concerns an arm joint for a manipulator and a manipulator having arm joints. The arm joint for the manipulator has a gear wheel rotatable about a transmission axis of rotation. The gear wheel is arranged mounted rotatably in a housing of the arm joint and has an adaptor at at least one of its ends. At its side remote from the end of the gear wheel the adaptor has an opening which is central relative to the transmission axis of rotation.

BACKGROUND

An arm joint of the general kind set forth is disclosed in DE 20 2014 101 342 U1, wherein the gear wheel is in the form of a worm gear mounted at the drive output side to the housing by way of an adaptor with a central opening. The structure is complex. Furthermore the structure does not offer any substantial variation options in regard to structure and use of the arm joint and thus the manipulator with such arm joints.

In another arm joint in accordance with DE 20 2016 101 255 U1, also fitted with a worm transmission, the arrangement has a rotary disk arranged in a complex structure at the drive output side to the worm gear, for connection to a spacer portion and more specifically transversely to the longitudinal section thereof. Here too, no uncomplicated variation options can be derived from the structural configuration.

SUMMARY

An object of the present invention is to develop the arm joint of the general kind set forth or the manipulator with the arm joint of the general kind set forth in such a way that it has a simpler construction, can be more easily assembled and affords a greater number of variation options in regard to structure and possible use.

As described in greater detail hereinafter, the female thread affords the possibility of a connection of the arm joint to, for example, the gear wheel and/or a housing of an adjacent arm joint of the manipulator, which connection can be quickly made, is secure and uncomplicated. As an expansion of the variation options, moreover, it is possible to make a connection to a motor shaft of a motor, in order by way thereof, to directly drive the gear wheel. In that way, certain kinds of connection can be made between two adjacent arm joints, and even to a next arm joint in addition to adjacent arm joints, which allow certain relative movements between the connected arm joints, torque transmission forms of arm joint to arm joint and/or transmission of torques.

By way of the thread engagement of a component with a male thread in the female thread of the adaptor it is possible to make an operative connection between the component and the gear wheel. That component for example can be part of a further arm joint or a motor acting on the joint axis.

In an advantageous development of the invention the housing can have a receiving portion for receiving a further transmission element. That further transmission element can be arranged transversely to the transmission axis of rotation. It can be operatively connected to the periphery of the gear wheel. In that way the gear wheel and the further transmission elements form a transmission for conversion of a torque. The periphery of the gear wheel can for example have a peripheral thread or a tooth arrangement like a spur or bevel tooth arrangement. The design of the periphery depends on the respective type of transmission constructed by the gear wheel and the further drive element. That is described hereinafter in further detail by way of example.

Mounting of the gear wheel can be effected by means of any suitable bearing like for example a friction bearing, a ball bearing, in particular a double ball bearing, or a roller bearing. Advantageously plastic bearings, in particular plastic plain bearings, can be used for mounting purposes. As is known plastic bearings can be lubricant-free and thus maintenance-free. The gear wheel can also be mounted in such a way as to be held non-displaceably in the axial direction. Mounting can be effected by way of radial-axial bearings which allow a freedom of movement of the gear wheel only in the peripheral direction.

The adaptor can be mounted to the housing rotatably about the transmission axis of rotation. Mounting of the transmission component can be effected solely by way of adaptors. The adaptor can be an individual component, preferably a one-piece component. The adaptor can be connected mechanically or integrally to the gear wheel, in particular in material-bonded relationship. The adaptor with the female thread can be arranged connected at least non-rotatably to the gear wheel, in particular fixedly or in one piece with the gear wheel. The central opening can be of a circular cross-section and can be introduced into the gear wheel in the direction of the axis of rotation. In particular the central opening is accessible from the exterior.

As is known, in accordance with the general definition a torque is not transmitted by way of an axis of rotation, but in contrast by way of a rotary shaft, to the transmission component mounted thereon, like the gear wheel. Based on the usual linguistic usage however reference is made to an axis of rotation hereinafter, even if a torque can be transmitted therewith. The actual function of the axis of rotation as a shaft or spindle then derives from that context.

It will be appreciated that the term housing also includes a frame structure or a base arrangement on which the arm joint is constructed.

The gear wheel can have an adaptor at its two ends and can be mounted rotatably in the housing by way of the two adaptors. In particular mounting of the gear wheel can be effected symmetrically relative to the transmission axis of rotation. The gear wheel can be mounted rotatably to the housing, in relation to the transmission axis of rotation, at both ends thereof by way of a respective adaptor. The bearings at both sides of the gear wheel can be of the same configuration.

In particular both adaptors at their sides remote from the ends of the gear wheel can respectively have an opening having a female thread, the opening being central in relation to the transmission axis of rotation. In that way to construct the manipulator with two or more arm joints, an operative connection can be made to an adjacent arm joint axially at both ends of the gear wheel. That connection can also be effected in relation to a torque axis like a motor axis of rotation and/or another component like an extension, coupling means or tool. Those connection options can also be combined by adopting a possible operative connection on the one side and another possible operative connection on the other side.

It is considered to be advantageous that the gear wheel and/or the further transmission element are respectively arranged in play-free relationship with the housing and/or the gear wheel and the further transmission element are arranged to co-operate with freedom from play. The freedom from play makes it possible to achieve a high level of operating smoothness and reduced wear of the transmission in operation. The freedom from play can be such that it can be re-adjusted or set for example to compensate for play which has occurred due to wear between the respective co-operating components. An adjusting device can advantageously be designed for play-free arrangement of the gear wheel and/or the further transmission element relative to the housing. Furthermore or in addition the adjusting device can serve for play-free arrangement of the gear wheel and the further transmission element relative to each other.

In a development of the arm joint the further transmission element can have an operative axis spaced in a spacing direction relative to the transmission axis of rotation. By way of that operative axis the further transmission element can be arranged mounted in the receiving portion of the housing. In particular the operative axis can be arranged transversely relative to the transmission axis of rotation. In a structurally simple fashion the operative axis can be perpendicular to the transmission axis of rotation. The transmission axis of rotation and the operative axis can be arranged in such a way as not to intersect. In particular the transmission axis of rotation and the operative axis can be arranged parallel to a plane.

The plane can extend perpendicularly to a spacing extending in the spacing direction between the operative axis and the transmission axis of rotation. The spacing direction can extend radially to the transmission axis of rotation and more specifically from the gear wheel towards the further transmission element.

The gear wheel and the further transmission component can be arranged movably relative to each other and can be arranged fixedly for adjusting a freedom of play in the spacing direction, axially with respect to the spacing direction. The relative movement for play adjustment in the spacing direction can be effected by displacement of the gear wheel and/or the further transmission element relative to the housing.

That relative mobility is provided only for adjustment purposes, in which respect being arranged play-free relative to each other they naturally do not involve any relative mobility in the direction of the play. Preferably the spacing is the minimum spacing between the operative axis and the transmission axis of rotation. Advantageously adjustment or setting can be effected by way of sliding movement on inclined planes operative in the spacing direction. Preferably only the gear wheel is arranged movably for adjustment in the adjustment direction, relative to the housing. The further transmission element can be arranged statically relative to the housing in respect of a linear movement in the adjustment direction.

The bearings for the gear wheel can respectively have a first bearing ring associated with the housing and a second bearing ring associated with the gear wheel. For adjusting the freedom from play which is axial in relation to the spacing direction an adjusting force can be coupled into the first bearing ring by way of the inclined plane in the direction from the gear wheel to the further transmission element. The inclined plane can suitably have a surface normal which faces with a directional component in the spacing direction towards the further transmission element. The inclined plane can be arranged inclined at a preferably constant angle of inclination relative to the spacing direction. The angle of inclination can be less than/equal to 45°, less than/equal to 30° or less than/equal to 10°. Preferably the angle of inclination is such as to provide a self-locking effect for the sliding movement. As is known a prerequisite for self-locking is that the resistance caused in the sliding movement due to friction to prevent slippage or rotation of two members which bear or rest against each other is less than or equal to a static friction which opposes such relative sliding movement of said members.

At least one adjusting element mounted movably to the housing can be provided as part of the adjusting device. In particular the adjusting element can be arranged movably transversely relative to the spacing direction on the housing and in particular can be fixed. The individual element can slide on the inclined plane, generating the adjusting force. For that purpose the adjusting element and/or the first bearing ring can respectively have an inclined plane, over which the sliding movement takes place.

In a structurally advantageously simple embodiment the adjusting element can be in the form of a screw bolt with a tapered working end, with which the screw bolt slides transversely relative to the adjustment direction into a matching adjusting recess on the first bearing ring. Advantageously in terms of the mechanical forces the screw bolt and the adjusting recess can be positioned at the level of a region of the first bearing ring, which is an upper region in relation to a direction from the further transmission element towards the gear wheel. Preferably this involves the uppermost region of the first bearing ring. The screw bolt itself can be arranged in preferably self-locking threaded engagement with the housing with screw mobility thereon. To avoid tilting moments a respective adjusting element can be provided at both sides of the gear wheel so that adjustment of the freedom from play can be effected at both sides of the gear wheel.

In a further specification of the arm joint the further transmission element can be arranged linearly movably in the direction of the operative axis and/or arranged rotatably about the operative axis at the respective receiving portion of the housing. The further transmission element can be in the form of a linear element like a toothed rack for relative linear movement. Together with the gear wheel this can provide a linear transmission. In the case of an embodiment which is rotatable about the operative axis the further transmission element can be for example in the form of a worm for a worm transmission or in the form of a spur gear for an inverted worm transmission.

For adjustment of a freedom from play which is axial relative to the operative axis the further transmission element can be arranged to be variable in position relative to the housing in the direction of the operative axis. The variation in position can but does not necessarily have to move in a slight range, for example to compensate for deviations which occur from a prescribed play-free mounting configuration, only upon assembly by adding up tolerances and/or upon operation due to wear.

When the transmission is in the form of a worm transmission with a worm gear and a worm the further transmission element can be in the form of a worm and the operative axis can be in the form of a drive shaft. The worm can be arranged non-rotatably on the operative axis. Furthermore the operative axis can be rotatably mounted axially preferably at both ends of the worm at or in the receiving portion. The bearings can axially support the worm at respective ends. As is usual the worm gear can have a tooth arrangement, in particular an inclined tooth arrangement, matching the thread of the worm.

The drive shaft can be arranged to be guided in a hollow profile member. That also provides protection for the drive shaft. For that purpose the hollow profile member can have a preferably central passage for the drive shaft, the passage preferably extending centrally in the longitudinal direction of the hollow profile member. In that arrangement the hollow profile member can serve solely for protection purposes and in particular for passing the drive shaft therethrough, ideally without coupling a torque into the arm joint. The drive shaft can be arranged with radial slippage in the passage. In the case of the worm drive the hollow profile member can be arranged non-rotatably and non-displaceably relative to the receiving portion at and/or in same. The drive shaft can be supported at the hollow profile member.

The hollow profile member can have two portions which are arranged spaced from each other at least over the axial extent of the worm, that is to say a first portion and a second portion. At least the first portion can be arranged axially movably for adjustment of an axial freedom from play of the worm on the drive shaft by way of a provided setting unit of the adjusting device towards the worm. Axial mobility can vary in the order of magnitude of a play to be compensated, similarly as already set forth hereinbefore in connection with play adjustment of the operative connection of the gear wheel and the further transmission element. That play can be eliminated by adjustment of the setting unit.

The two portions can be respectively arranged in oppositely disposed relationship on the receiving portion at the end regions facing away from the worm. In particular the first portion of the hollow profile member can be mounted at one end on the setting unit and at its other end arranged in opposite relationship towards the worm. The setting unit in turn can be mounted on the receiving portion. Correspondingly the second portion of the hollow profile member can be mounted with its one end towards the worm and with its other end on the receiving portion in opposite relationship. The first portion of the hollow profile member can be supported by way of the setting unit and the second portion of the hollow profile member can be supported by way of a provided clamping element, on the receiving portion, wherein the clamping element is axially screwed against an abutment on the housing in relation to the operative axis. As usual the clamping element can have two axial sleeves, that is to say a radially inner sleeve and a radially outer sleeve which are in threaded engagement by way of conical threads. With progressive screwing the outer sleeve exerts an increasing pressure by way of the inner sleeve on the hollow profile member, which can lead to frictional engagement with the hollow profile member. In that case the hollow profile member is fixed to the housing by way of the clamping element screwed to the housing. If no pressing force is generated the clamping element screwed to the housing serves as a plain bearing.

The worm can be arranged on the drive shaft in axially non-displaceable relationship, in particular with a press fit. The spacing of the portions, with freedom from play, can be precisely equal to the axial extent of the worm and the drive shaft mounting.

The setting unit can be operative in relation to the further transmission element in the direction of the operative axis. For adjusting the freedom from play the setting unit can be designed to press the first portion of the hollow profile member and by way thereof the mounting means axially in the direction from the first portion of the hollow profile member towards the second portion thereof, against the worm. In particular the first portion of the hollow profile member can be supported with one end thereof at the setting unit and with the other end thereof at a bearing of the mounting arrangement, which is a front bearing with respect to a direction from the setting unit towards the worm. The second portion of the hollow profile member can be correspondingly supported with one end thereof at the bearing which is the rear bearing with respect to the direction from the setting unit towards the worm. In that respect the other end can be supported at the receiving portion by way of a provided clamping element.

The axial spacing of the two portions of the hollow profile member can thus include, besides the axial extent of the worm, also the axial extent of the front and rear bearings of the drive shaft on the hollow profile member. Preferably the thread of the clamping element and/or the setting unit is a self-locking thread.

In a specific configuration of the arm joint the setting unit can have a blind opening which is axial relative to the operative axis. The drive shaft can be arranged with a free end thereof projecting freely into the axial blind opening. The setting unit on the one hand can be fixed to the receiving portion and on the other hand can have for example a component mounted displaceably on the hollow profile member, like a sleeve, which bears at the end against the front bearing with respect to the operative axis. By means of a provided setting means of the setting unit the sleeve can be further pressed against the worm with axial displacement of the front bearing until freedom from play is achieved. In particular the setting unit can be designed in the fashion of a cap nut. Advantageously the setting means can be actuable from the exterior. It can have a transmission means with thread engagement. The thread engagement can be self-locking.

With rotation of the screw element the front bearing can be axially displaced for setting a given play until freedom from play is achieved. If for example when a play occurs due to wear re-adjustment is necessary then the play which has occurred can be easily eliminated again by actuation of the setting means.

In another development of the arm joint the transmission can be in the form of an inverted worm transmission. In an inverted worm transmission, conversely to the usual worm transmission, the further transmission element can be driven by the gear wheel. In particular it can be provided that the operative axis is in the form of a drivable hollow profile member with the internal passage for receiving the drive shaft like a motor shaft. The gear wheel can be arranged non-rotatably on the hollow profile member. The hollow profile member in turn can be mounted movably at or in the receiving portion. That affords the possibility that, in addition to the hollow profile member being in the form of the drive shaft, it is possible to provide a further drive shaft which extends in the passage and which ideally without transmitting a torque to the hollow profile member, is guided by the hollow profile member past the arm joint in order for example to couple a torque into an adjacent arm joint.

The gear wheel can have a peripheral male thread and the further transmission component can have a spur tooth arrangement adapted to the male thread. The gear wheel with its male thread is in threaded engagement with the spur tooth arrangement on the further transmission component. Preferably in the worm transmission the thread pitch of the male thread of the further transmission element in the form of the worm gear is greater and in particular is about 1.5 times to 4 times greater than the thread pitch of the male thread of the gear wheel which is in the form of the 'worm' in the inverted worm transmission. Due to structural considerations, as a result of the small thread pitch in the inverted worm transmission, a play which possibly occurs can be even less than that in the case of a worm transmission.

In a further advantageous configuration of the arm joint it can be provided that, as part of a linear transmission, the gear wheel is in the form of a sprocket and the further transmission element is in the form of a linear element, in particular a toothed rack element. The toothed rack element can at the same time form the operative axis and can be arranged linearly displaceably on the receiving portion. In an advantageous development the linear element, in particular the toothed rack element, can be arranged in a receiving groove in the hollow profile member, which in the installation position is open towards the gear wheel. In that case the receiving groove can be so matched to the linear element that the linear element is arranged non-displaceably in the direction of the operative axis and circumferentially in relation thereto. Preferably the linear element is arranged in the receiving groove in an invariable position.

The hollow profile member can be in the form of a multi-function profile member which is also advantageous in regard to the increase in possible variations.

For that purpose, as described above, the hollow profile member, in a transmission in the form of a linear transmission, can have a receiving groove for the linear element, in particular the toothed rack portion, the groove being open in the installation position towards the gear wheel. As already described as an advantageous feature of the hollow profile member the possible passage-like through opening extending in the longitudinal direction of the hollow profile member or also the internal passage for the drive shaft or for the motor drive shaft is as already described as an advantageous feature of the hollow profile member.

In addition the hollow profile member can have a further receiving groove for receiving sensor elements like travel sensors or a magnetic strip and/or control and/or supply lines for the sensor elements. Preferably that further receiving groove is arranged at an outside of the hollow profile member, that is diametrally opposite to the operative axis. In addition the hollow profile member can have an abutment device for limiting a linear travel in that, for example for a linear transmission or a worm transmission, it laterally has in particular receiving grooves of an undercut configuration for fixing elements for non-rotatably linking the hollow profile member to the receiving portion of the housing. For that purpose for example anchor elements adapted to the cross-section of the associated receiving groove can be provided, which are arranged at least in one of the lateral receiving grooves displaceably and in particular fixably in same. By way of such anchor elements the hollow profile member can also be held non-rotatably and non-displaceably relative to the housing.

In a further particularly advantageous simplification of the structure, for attaining the object of the invention, and for enhancing the possible variations, it can be provided that the arm joint overall and/or the transmission components are respectively of a modular structure. The drive component and the further drive element can be individual modular components. They can be assembled to form the transmission, to produce a given kind of transmission like a worm transmission, an inverted worm transmission or a spur gear transmission, without the support means of the gear wheel having to be altered for that purpose. A similar consideration applies to the associated adaptors in the form of modular components, wherein they can also be advantageously of such a design that they can be universally used for described types of transmission.

In that way the modular components are easily interchangeable and can be varied with each other. As is immediately apparent such a modular structure is inexpensive. It is possible for example to provide a modular construction system with modular components of different types of transmission and different transmission sizes, housing and/or housing portions like a cover or end termination elements, adaptors and/or hollow profile members.

The arm joint can be designed to be drivable by motor means. The arm joint can be part of a motor drive with an electric motor and a transmission for conversion of the motor torque. For that purpose an associated motor can be arranged spaced in relation to the arm joint. The motor can be arranged remotely from the transmission. That has the advantageous that the arm joint in itself can be kept structurally smaller and thus more mobile and in addition waste heat generated by the motor, if at all, can act only slightly on the arm joint. Advantageously the transmission can be driven directly by the motor. As can be seen in particular from the specific description the motor torque can be transmitted for example by way of the drive spindle to the gear wheel or to the further transmission element.

A further advantage is that a series of different motors is suitable for use, in which respect they can be selected on the basis of given conditions like maximum torque as well as the type and the level of the operating voltage. Advantageously the motor can be in the form of a brushless dc motor.

Particularly advantageously there can be provided a manipulator having at least one arm joint in accordance with one of the embodiments described hereinbefore and hereinafter. In particular the manipulator can have at least two arm joints arranged in operative relationship with each other. The structural configuration of the at least two arm joints can be the same at least as far as the gear wheel and the further transmission element.

The at least two arm joints can be mechanically interconnected. The two arm joints can be interconnected by means of a connecting device in a connecting position in force-operative, motion-operative and/or guide-operative relationship. The at least two arm joints can be arranged in mutually facing coaxially aligned relationship with respect to the transmission axis of rotation. In particular the at least two arm joints can be mounted rotatably about a common transmission axis of rotation. The at least two arm joints can be arranged in mutually facing relationship at their ends in relation to the transmission axis of rotation. For that purpose the mutually facing ends of the arm joints can respectively have the central opening. The central openings can be arranged in mutually aligned relationship. In particular the central openings of the at least two arm joints can be of the same configuration.

The connecting device can have parallel connectors, by means of which the at least two arm joints in the connecting position are arranged with respect to a plane perpendicularly to the transmission axis of rotation in mutually parallel relationship and held axially non-displaceably relative to each other. The parallel connectors in the connecting position can serve for spaced parallel positioning of the at least two arm joints and/or for connecting the at least two arm joints. In addition by means of the parallel connectors, the at least two arm joints and in addition further directly or indirectly adjacent arm joints can be held in parallel spaced relationship and connected. In particular the parallel connectors can be at least substantially rotationally symmetrical relative to the transmission axis of rotation.

Advantageously the connecting device can be so designed that the parallel connectors in the connecting position functionally operatively engage given components of the arm joints. In a further design specification of the manipulator it can respectively be provided with respect to the transmission axis of rotation that at least one radially inwardly disposed parallel connector in the form of an internal connector engages in torque-transmitting relationship into the mutually facing central openings at the ends of adjacent arm joints. In addition a radially outwardly disposed parallel connector in the form of an external connector can be provided, designed for engagement at the housings of arm joints in end-wise adjacent relationship. In addition a parallel connector which extends transversely relative to the transmission axis of rotation and which is in the form of a transverse connector can be provided, which is adapted to engage the housings of an arm joint adjacent to another arm joint at the ends thereof, in torque-transmitting relationship radially inwardly into the central opening of an arm joint and radially spaced relative to the central opening.

It can be provided that transmission of the torque from the transmission axis of rotation of the one arm joint to the transmission axis of rotation of the other arm joint is effected by way of the connection of the two arm joints. For that purpose the housings of the two arm joints and the transmission axis of rotation of the two arm joints are respectively fixedly connected together. In advantageously simple fashion the transmission axes of rotation of the two arm joints can be non-rotatably connected together by way of an internal connector and the housings of the two arm joints can be non-rotatably connected by way of an external connector.

Alternatively the connection between the two arm joints can be in the form of a rotary connection. In the rotary connection the torque acting on the transmission axis of rotation, of one of the two arm joints, can be transmitted to the housing of the other arm joint. In particular it can be provided that the two arm joints are rotatably connected together by way of a transverse connector extending transversely relative to the transmission axis of rotation. The transverse connector can be connected to the transmission axis of rotation of one of the two arm joints, with a radially inner end portion, in non-rotatable, in particular non-rotatable and non-displaceable relationship. In addition the transverse connector with a radially outer end portion can be connected in sliding and rolling movement relationship to the housing of the one arm joint and fixedly to the housing of the other arm joint. In that way the housing of the one arm joint can bear in sliding or rolling displaceable relationship against the radially outer end portion of the transverse connector.

In a further embodiment of the manipulator the at least two arm joints can be connected together, forming a rotary guide means for the one arm joint on the other arm joint. In particular an arm joint rotated about the transmission axis of rotation can be guided on the other arm joint. In particular, except for possible frictional losses caused by the guide means, that can occur without substantial transmission of torque from the one arm joint to the other. Ordinary measures like for example a Teflon coating on the frictional surfaces, can be provided to reduce friction. In an advantageously simple fashion by virtue of the parallel connectors the transmission axes of rotation of the two arm joints can be fixedly connected by way of a radially inwardly disposed parallel connector in the form of an internal connector, and by a radially outwardly disposed parallel connector in the form of an external connector being connected in sliding or rolling movable relationship to the housing of the other arm joint and non-rotatable to the housing of the one arm joint. Alternatively the external connector for providing the rotary guide means can be connected in sliding or rolling movable relationship to the housing of the one arm joint and non-rotatably to the housing of the other.

The non-rotatable connection of the transmission axes of rotation by way of the internal connector, in the rotary guide means, firstly provides that the two arm joints are axially held together. In the rotary guide means, the one arm joint is guided with its rotation at the other arm joint, that is to say at the housing thereof. Furthermore, except for possible frictional losses, no torque is transmitted to the other arm joint. The consequence of this is that the transmission for example of the other arm joint is still 'free' for coupling in for example a motor torque.

The parallel connectors, insofar as they are designed to engage in the connecting position in torque-transmitting relationship into one of the mutually facing central openings or into both openings, to provide the respective engagement, can have an end portion having a male thread adapted to the female thread of the respective central opening. In the connecting position the two threads engage in torque-transmitting relationship into each other. For that purpose a suitable screw-in travel for producing the screw connection can be limited by virtue of an abutment. Correspondingly the internal connector for producing a non-rotatable connection of the two arm joints can have two free ends each having a portion with a male thread for engagement into the central openings, facing towards each other in the installation position, of two axially adjacent arm joints. In the non-rotatable connection direct transmission of torque from one gear wheel of the one joint to the gear wheel of the other joint can be implemented.

It is viewed as a particular advantage for relative rotation of the female thread relative to the male thread to be blocked in the connecting position. In particular the female thread and the male thread are fixed to each other. That permits an arrangement, which is play-free in relation to the transmission axis of rotation, of the portion with the male thread, which is in threaded engagement with the female thread of the central opening. In particular it can be provided that there is at least one blocking element like a bolt, pin or screw element for play-free threaded engagement of the female thread of the central opening and the male thread of the end portion. The blocking element in the connecting portion can be arranged to be introduced axially in relation to the transmission axis of rotation into a blocking opening matching same between the two interengaging threads. The blocking opening can be produced by an identical semicircular groove being provided in both threads, in which case the two grooves come together to provide the circular blocking opening in a given relative rotational position of the two threads. To achieve its connecting position the end portion can be screwed play-free against the abutment into the central opening. The blocking element can then be introduced between the two threads. The blocking element permits a play-free non-rotatable connection by blocking engagement of the threads. Preferably with the blocking element being screwed into place, the two components with the central openings are screwed against each other at their ends.

The blocking element can be introduced parallel to the transmission axis of rotation, intersecting both threads. It is possible to provide in relation to the two threads an overlap region in which the male thread and the female thread in the threaded engagement state radially overlap with respect to the transmission axis of rotation. The overlapped region can be of a hollow-cylindrical shape corresponding to the cylinder geometry of the central opening.

If for example freedom of play in the screw connection disappears due to wear, by the two components no longer bearing against each other at their ends in play-free relationship, the blocking element can be released, the components screwed relative to each other to afford a play-free state and then the blocking element can be re-introduced between the threads.

Preferably there are provided a plurality of, for example six or eight, blocking openings which are preferably peripherally equally spaced in the connecting position and further arranged on the same radius with respect to the transmission axis of rotation. The number of grooves constituting the blocking openings provide for a reduction in the rotary angle necessary to achieve a rotational position for re-adjustment, being the position in which the grooves come together again to form the blocking openings.

In an advantageous embodiment the manipulator can be of a modular structure. Individual modules can be for example the arm joints in themselves, the motor, the motor shaft for the transmission of torque to the transmission, in particular to the gear wheel or the further transmission component, the respective individual components of the arm joint like housing, gear wheel, further transmission component, adaptor, further connecting components like the parallel connectors, and/or the hollow profile member.

BRIEF DESCRIPTION OF THE DRAWINGS

Further details and advantages of the invention will be apparent hereinafter, without restriction on the scope of protection, from the description of preferred embodiments with reference to the accompanying drawings in which:

FIGS. 1A-1D each show a view of an embodiment of an arm joint;

FIGS. 2A-2B each show a view of a further embodiment of the arm joint similar to that of FIG. 1, but with an adjusting device;

FIG. 2C shows a partial view on an enlarged scale at IIC as shown in FIG. 2B;

FIGS. 3-5 each show a view of a further embodiment of the arm joint with torque-transmitting connected motor;

FIG. 6 shows a side view with an individual illustration of the co-operating transmission members of FIGS. 1-5;

FIG. 10 shows a side view of a further embodiment of the arm joint, here with a linear transmission;

FIG. 11 shows a cross-sectional view with respect to the transmission axis of rotation of the arm joint of FIG. 10;

FIGS. 12A and 12B each show a view of a hollow profile member axis; FIG. 12A with a magnetic strip;

FIG. 13 shows a perspective view of a tooth rack profile member for the arm joint of FIG. 11;

FIG. 14 shows a perspective view of a sensor means which can be fixed to the housing;

FIG. 15 shows a side view of the embodiment of the arm joint of FIG. 1, here with an end guide insert for a motor shaft;

FIG. 16 shows a longitudinal sectional view C-C, with respect to the transmission axis of rotation, of the arm joint of FIG. 15;

FIG. 17 shows a partial view J on an enlarged scale as shown in FIG. 16;

FIGS. 18A-18D each show a view of one of the components of the guide insert of FIG. 15;

FIG. 19 shows a perspective view of two fixedly interconnected arm joints IV and of an embodiment of a manipulator;

FIGS. 20A and 20B show a side view and a longitudinal sectional view of the arm joints of FIG. 19;

FIGS. 21A and 21B each show a view of an external connector for non-rotatable connection of the housings of the two arm joints of FIG. 18;

FIG. 22 shows a perspective view of an internal connector for fixedly connecting the two rotary joint axes of the two arm joints of FIG. 18;

FIG. 23 shows a perspective view of two rotatably interconnected arm joints I and II of a further embodiment of the manipulator;

FIGS. 24A and 24B each show a view of a transverse connector for rotational connection of the two arm joints of FIG. 23;

FIGS. 25A and 25B show a perspective view and a longitudinal sectional view of three interconnected arm joints I-III of a further embodiment of the manipulator, wherein the arm joints I and II are rotatably connected together and the arm joints II and III are connected together in rotational guiding relationship;

FIGS. 26A and 26B each show a view of a further embodiment of the external connector for implementing a rotary guide means between arm joints II and III;

DETAILED DESCRIPTION OF THE DRAWINGS

Figure 7:
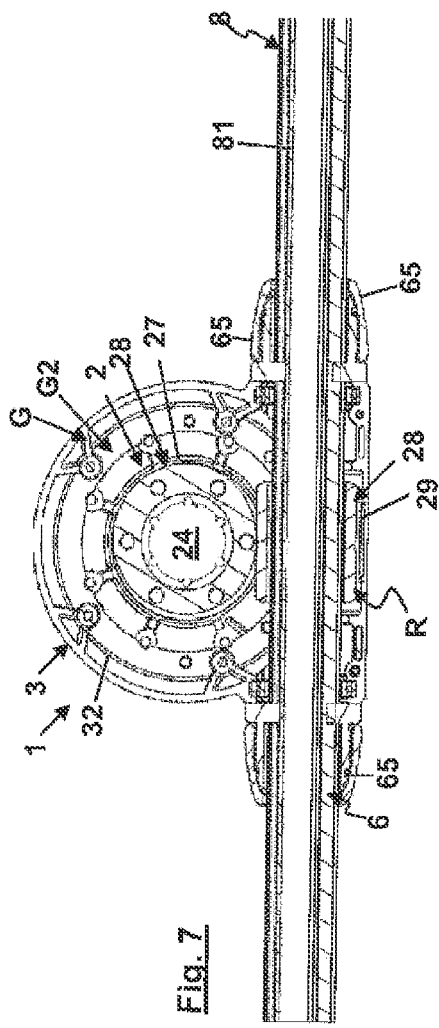
FIG. 7 shows a cross-sectional view in relation to a transmission axis of rotation of a further embodiment of the arm joint, here with inverted worm transmission.
Figure 9:
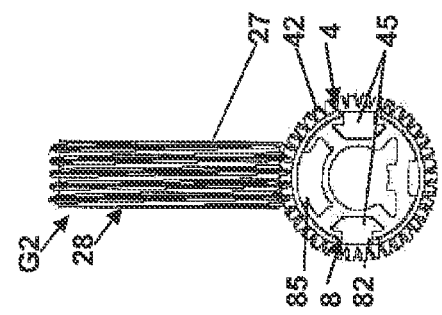
FIGS. 8 and 9 each show a side view with an individual illustration of the co-operation of the transmission members of FIG. 7.
Figure 8:
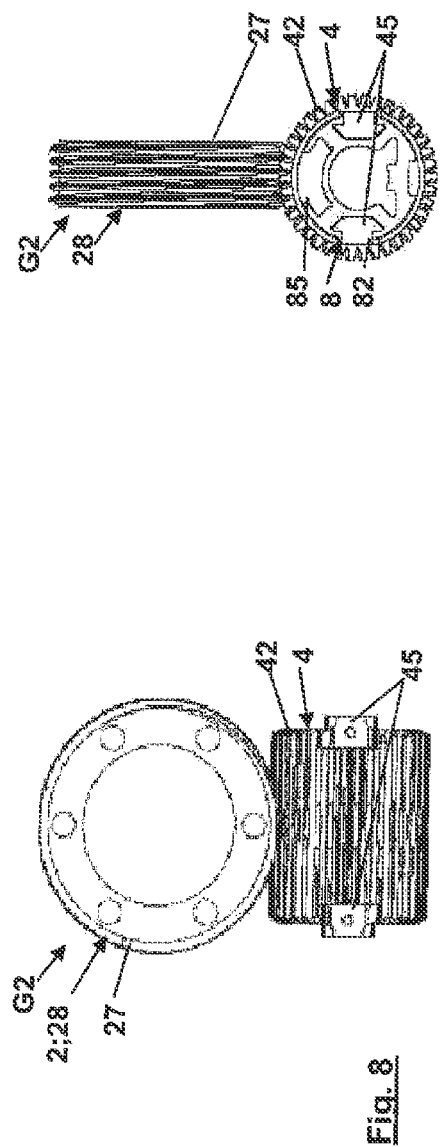

In the description all terminology for describing location like up, down, front, rear, right and left are intended as they are shown in the respective Figure itself, unless otherwise defined. FIGS. 1 to 18, without wishing to be restricted thereto, show possible embodiments of an arm joint 1 for a manipulator M in different views and partial views. FIGS. 19 to 32 show possible embodiments of the manipulator M with arm joints 1 which are combined together and which are operatively connected together. It is immediately apparent that a plurality of further combinations and couplings of the arm joints 1 is possible, which are also to be included in the scope of protection.

As can be seen in particular from FIGS. 1, 2, 5, 8, 11, 16, 20B, 25B, 28, 29B and 32B the arm joints 1 each have a gear wheel 2 rotatable about a transmission axis of rotation g. The gear wheel 2 is mounted rotatably in a housing 3 of the arm joint 1. In the embodiments of the arm joint 1 shown in the Figures it has a respective adaptor 22 at both of its ends 21. The gear wheel 2 is arranged rotatably in the housing 3 by way of a respective bearing 7 by way of the two adaptors 22, that is to say at both sides in relation to the transmission axis of rotation g. FIGS. 18A and 18B each show an individual view of the adaptor 22 which here is an independent component. Alternatively at least one of the adaptors 22 can be integrally connected to the gear wheel 2.

The two adaptors 22 each have at their side 23 facing away from the end 21 of the gear wheel 2, an opening 24 which is central with respect to the transmission axis of rotation g and has a female thread 25. At the minimum it is also possible for only one of the two adaptors 22 to be provided with the central opening 24. As FIGS. 18A and 18B show the adaptors 22 each have axially projecting push-in projections 221 which here are cylindrical and which are arranged on a radius and are peripherally equally spaced, and in the installation position respectively engage axially into a plug opening 222 associated therewith and provided on the gear wheel 2. As an adaptor with the projections 221 is provided at both sides of the gear wheel the openings 222 are in the form of through openings, into which in the installation position an associated projection 221 respectively engages from two sides. The adaptors 22 and the gear wheel 2 overall are each rotationally symmetrical with respect to the transmission axis of rotation g.

The housing 3 has a receiving portion 31 for receiving a further transmission element 4. The further transmission element 4 is arranged transversely to the transmission axis of rotation g on an operative axis w. The operative axis w is positioned in spaced relationship with the transmission axis of rotation g. The further transmission element 4 is arranged mounted in the receiving portion 31 by way of the operative axis w. In the illustrated embodiment of the arm joint 1 both axes, that is to say the operative axis w and the transmission axis of rotation g, extend in mutually parallel spaced relationship with a plane extending perpendicularly to a spacing between the operative axis w and the transmission axis of rotation g, said spacing extending in the spacing direction a. In this case the spacing is the minimum spacing between the two axes. The transmission axis of rotation g and the operative axis w do not intersect.

The transmission element 4 is operatively connected to the periphery of the gear wheel 2. The gear wheel 2 and the further transmission element 4 form a transmission G for transmission of a motor torque which is coupled into the arm joint 1. The motor 5 in itself is arranged spaced from the respectively associated arm joint 1.

The gear wheel 2 and the further transmission element 4 are arranged to act play-free within each other axially with respect to the spacing direction a. For that purpose the gear wheel 2 and the further transmission element 4 are arranged movably relative to each other in the spacing direction a. To set the freedom from play, in the illustrated embodiments of the arm joint 1, solely the gear wheel 2 is arranged by means of an adjusting device 6 movably relative to the housing 3 in the spacing direction a. The relative movement is effected here by displacement of the gear wheel 2 in the spacing direction a towards the further transmission element 4.

The adjusting device 6 is fitted at the bearings 7 of the gear wheel 2 or the adaptor 22 thereof, by way of which the gear wheel 2 is mounted. The gear wheel 2 is rotatably mounted by way of its adaptors 22 axially at both sides by way of a respective bearing 7 on the housing 3. The bearings 7 each have a first bearing ring or race 71 which is associated with the housing 3 and which here is arranged externally with respect to the transmission axis of rotation g and a second bearing ring or race 72 which is associated with the gear wheel 2 and which is arranged internally with respect to the transmission axis of rotation g. For adjustment purposes an adjusting force E acting in the spacing direction a towards the further transmission element 4 is coupled at least into one of the first bearing rings 71. Advantageously in terms of mechanical force implementation it is provided here that the adjusting force E is applied to the gear wheel 2 for displacement thereof by way of the two first bearing rings 71.

For that purpose an adjusting force K is produced by way of the adjusting device 6 radially with respect to the spacing direction a, which force is introduced into the respectively associated first bearing ring 71 by way of sliding on inclined planes S operative in the spacing direction a, diverted in the spacing direction a in the direction towards the further transmission element 4. The inclined planes are here respectively arranged at the same angle of inclination to the spacing direction a, which here is less than 60°. For that purpose, provided for each first bearing ring 71 is an adjusting element 61 which is arranged on the housing 3 in a variable position in an adjusting opening 62 with respect to the spacing direction a in the radial direction towards the first bearing ring 71. That adjusting opening 62 is arranged above the transmission axis of rotation g, more specifically at a point that is the uppermost point of a radius extending around the transmission axis of rotation. In that way the respective first bearing ring 71 is at the same time acted upon at its uppermost point with the adjusting force E, in an advantageous fashion in terms of mechanical forces. The adjusting element 61 has a threaded shaft with a male thread, with which it is in threaded engagement with a female thread in the adjusting opening 62. That threaded engagement is self-locking. The adjusting element 61 projects with a conical working end having the inclined plane S into the housing and in a working position bears against an inclined plane S provided in an adjusting recess on the first bearing ring 71. In that way the gear wheel 2 can be pressed against the further transmission portion 4 with a screw movement of the adjusting element 61, under the action of the inclined planes S, in the spacing direction a, until it bears in play-free relationship against the transmission portion. For engagement of the working end the first bearing ring 71 has an opening which is matched to the working end and thus also has the inclined plane S.

Other than for protecting the transmission G the arrangement, as part of the housing 3, has axially at both sides of the gear wheel 2, a respective annular cover 32 which is arranged coaxially with respect to the transmission axis of rotation g and has a ring opening 33. The cover 32 is radially outwardly fixed to the housing 3. If functionally necessary the cover 32 is provided with a central ring opening 33, by which the respectively associated central opening 34 remains uncovered or is at least accessible from the exterior. The ring opening 33 can also serve for supporting, in particular in a plain bearing, the drive shaft 51, the motor shaft 52 and/or the hollow profile member 8. The size of the ring opening 33 can be designed to be minimised to the respective purpose, for example for support on the respective diameter of the shafts 51; 52 or the hollow profile member 8. In addition, as can be seen from FIGS. 2B and 2C, the cover 32 can have the adjusting opening 62, in which the above-described adjusting element 61 is arranged accessibly from the exterior and mounted capable of a screwing movement in the cover 32.

The further transmission element 4 is arranged axially play-free with respect to the gear wheel 2, in relation to the operative axis w. In the embodiment of the arm joint shown in FIGS. 1 to 6 the transmission G is in the form of a worm transmission G1 with the output side gear wheel 2 in the form of a worm gear 26 and the input side further transmission element 4 in the form of the worm 41. The worm gear 26 and the worm 41 are shown in threaded engagement in FIG. 6 without the rest of the arm joint 1. The usual inclined tooth arrangement 261, matching the screw 41, of the screw gear 26 is clearly apparent. As can be seen from FIG. 5 the operative axis w here is a drive shaft 51 driven directly by a motor 5. The worm 41 is arranged in a clamping fit on the drive shaft 51.

As can be seen from FIG. 5 the drive shaft 51 is arranged protected in a hollow profile member 8, more specifically in a central internal passage 81 provided in the hollow profile member 8. The drive shaft 51 is further rotatably mounted axially with respect to the operative axis w on both sides of the worm 41 by way of a respective bearing 7 on the receiving portion 31. Adjustment for mounting the further transmission element 4 in play-free relationship axially with respect to the operative axis w, and thus play-free interaction axially with respect to the operative axis w of the gear wheel 2 and the further transmission element 4 is effected similarly to the above-described adjustment for interaction of the gear wheel 2 and the further transmission element 4, such interaction being play-free axially with respect to the spacing direction a. Here however displacement of the gear wheel 2 axially relative to the operative axis w is effected by way of its bearings 7. The hollow profile member 8 itself is arranged non-rotatably and non-displaceably relative to the receiving portion 31. For that purpose provided at both sides of the hollow profile member 8 are undercut receiving grooves 82 in which anchor projections provided on the receiving portion 31 engage for non-rotatable mounting of the hollow profile member 8.

The hollow profile member 8 is divided into two portions, that is to say a first portion 83 and a second portion 84. The two portions 83; 84 are arranged spaced from each other over the extent, axially with respect to the operative axis w, of the two bearings 7 supporting the drive shaft 51 on the hollow profile member 8, and the axial extent of the worm 41. In that way the region around the worm 41 is accessible from the exterior for the worm gear 26. In addition structurally uncomplicated adjustment of the operative connection between the gear wheel 2 and the further transmission element 4 is made possible, as far as freedom from play axially with respect to the direction of the operative axis w. The two portions 83; 84 respectively engage with an end towards the worm 41, at the ends thereof, at the bearing 7 associated therewith, that is to say in each case with respect to the direction from a setting unit 67 towards the worm 41, a front bearing 73 and a rear bearing 74, wherein they are respectively supported at the receiving portion 31 with their other end that is remote from the worm 41.

The second portion 84, as arranged at the right in FIG. 5, is supported by way of a clamping element 65. In the working position it bears peripherally in friction-locking relationship radially outwardly against the second portion 84. The clamping element 65 is further arranged screwably on the receiving portion 31. The clamping element 65 is so designed that, with progressive screwing at the receiving portion 31 it peripherally exerts a correspondingly increasing radial frictional force on the second portion 84, and in this application that causes frictional engagement with the second portion 84.

The first portion 83, arranged at the left in FIG. 5, bears with its supported end in force-transmitting relationship against the setting unit 67. The unit is arranged screwably on the receiving portion 31, in the direction of the operative axis w. The setting unit 67 has an adjusting device 671, by way of which the first portion 83 can be pressed against the front bearing 73 with axial displacement on the hollow profile member 8, the bearing then being pressed against the further transmission element as far as freedom from play. In that way the axial play in the operative connection between the gear wheel 2 and the further transmission element 4 can be eliminated. As can be seen for example from FIG. 4 the adjusting device 671 is actuable by rotation of a cap nut accessible from the outside. The setting unit 67 has a blind opening 66 which is axial relative to the operative axis w and into which the drive shaft 51 projects at the end while remaining free therein. Remaining free means without bearing against the blind opening 66 at the inside thereof.

The above-described bearings 7 for the gear wheel 2 and the further transmission element 4 in the form of the worm 41 are each in the form of roller bearings in the illustrated embodiments of the arm joints 1, but the invention is not limited thereto, as any other suitable forms of bearing can be used. Alternatively at least some of the bearings can be in the form of respective plain bearings, in particular plastic plain bearings, which are advantageously lubricant-free.

FIG. 7 is a cross-sectional view with respect to the transmission axis of rotation g of another embodiment of the arm joint 1. The transmission G is here in the form of an inverted worm transmission G2. Conversely to the worm transmission G1 here the torque is introduced at the drive side by way of the gear wheel 2 and transmitted out of the transmission at the drive output side to the operative axis w by way of the further transmission element 4. As can be seen from FIGS. 8 and 9 the gear wheel 2 in the form of a spur gear accordingly has a peripheral male thread 27 and the further transmission element 4 has a spur tooth arrangement 42. The hollow profile member 8 which is here at the drive output side forms the operative axis w. The further transmission element 4 is arranged non-rotatably on the hollow profile member 8. The hollow profile member 8 is supported in the receiving portion 31 rotatably by way of two axially mutually spaced clamping elements 65. The clamping elements 65 serve here for guidance and support without clamping of the hollow profile member 8. As described above the hollow profile member 8 has an internal passage 81. As the internal passage 81 is not needed to constitute the inverted worm transmission G2 in the embodiment of the arm joint shown in FIG. 1, other components like lines or, as indicated by way of example in FIG. 31, a further drive shaft 51 for a remote arm joint, can be passed through the hollow profile member 8 without the further drive shaft 51 transmitting a torque to the arm joint 1.

FIGS. 10 and 11 each show a view of a further embodiment of the arm joint 1; FIGS. 12, 13 and 14 each show individual components of this embodiment. As part of a linear transmission G3, the gear wheel 2 is in the form of a spur gear 28 and the further transmission element 4 is in the form of a toothed rack element 43. The toothed rack element 43 forms the operative axis w. The toothed rack element 43 is arranged in the installed position in a first receiving groove 84 which is open towards the gear wheel in the installation position. The first receiving groove 84, like also the lateral receiving grooves 82, are of an undercut configuration. In the installation position the toothed rack element 43 engages into the first receiving groove 84 by way of a foot 44 which is matched to the undercut configuration, and is thereby mounted axially non-rotatably and radially non-displaceably to the hollow profile member. In addition provided at both sides of the toothed rack element 43 are clamping elements 65 which are arranged in a clamping fit on the hollow profile member 8 and against which the toothed rack element 43 axially bears at the ends against clamping elements 65. In that way the toothed rack element 43 is held axially non-displaceably in the receiving groove 84. The first receiving groove 84 is arranged opened towards the gear wheel 2 for tooth engagement into same.

FIGS. 12A and 12B show a perspective view and a cross-sectional view of the hollow profile member 8. Besides the above-mentioned lateral receiving grooves 82 for non-rotatably arranging the hollow profile member 8 and the upper receiving groove 85 a lower receiving groove 86 is provided at the underside for receiving measurement components, in which case by way of example a magnetic strip Ma for travel measurement is arranged here. FIG. 14 shows an associated sensor means R for travel measurement, the sensor means R being of a half-shell shape and being adapted to be fixed with respect to the operative axis w centrally at the receiving portion 51.

FIGS. 19 to 26B show side views, sectional views and individual views of three basic forms of connection between at least two arm joints 1. They are arranged coaxially and at the ends in mutually parallel relationship with respect to the transmission axis of rotation g. They each have the central opening 24 at least at the mutually facing ends, the two openings 24 being arranged in mutual alignment. The at least two arm joints 1 are part of an embodiment of the manipulator M. To make the connection between the arm joints 1, there is a connecting device 9 having parallel connectors 91, by means of which the arm joints 1 are arranged parallel and spaced from each other and mounted rotatably about a common transmission axis of rotation g.

In FIGS. 19 to 21 two arm joints 1 are fixedly connected together, constituting a rigid connection VI, that is to say the housings 3 of the at least two arm joints 1 and the gear wheels 2 of the at least two arm joints 1 are respectively non-rotatably connected together. For that purpose the two transmission axes of rotation g of the two arm joints 1 are non-rotatably connected together by a radially inward parallel connector 91 in the form of an internal connector 92. In addition the housings 3 of the two arm joints 1 are non-rotatably connected together by way of a radially outward parallel connector 91 in the form of an external connector 93. When therefore a torque is applied to the transmission axis of rotation g of the one arm joint 1 then the torque is transmitted directly to the transmission axis of rotation g of the other arm joint 1, more specifically in the ratio 1:1. The same applies for coupling a torque into the housing 3 of an arm joint 1 and transmission thereof to the housing 3 of the other arm joint 1.

The internal connector 92 and the external connector 93 are respectively shown in individual views in FIGS. 21A and 21B and in FIG. 22. The internal connector 92 is of an elongate form with a respective male thread 95 at both ends, with which it engages non-rotatably into the two mutually facing openings 24 of the two interconnected arm joints 1.

The external connector 93 is of an annular shape, the two arm joints 1 being held in mutually spaced relationship over the axial extent thereof. In addition provided axially at both ends at the periphery are equally spaced plug connections 94 which are arranged on a radius and which in the installation position axially engage into plug openings correspondingly provided on the housing 3. The two arm joints 1 are axially held together by the internal connector 92 and are held pressed axially against the external connector 93.

For rotationally securing the thread engagements of the female thread 25 and the male thread 95, in respect of both arm joints 1 it is respectively provided that a plurality of identical blocking elements 68, here each in the form of a screw element 681 (see FIG. 17), are axially screwed into an overlap region of the two interengaging threads 25; 95 in order thereby to block relative rotation of the two threads 25; 95. This ensures that the two interconnected arm joints 1 are held axially non-displaceably and non-rotatably.

The screw elements 681, here being eight, are arranged on a radius and equally peripherally spaced. Associated with each screw element 681 is a blocking opening 69 (see FIG. 17) between the interengaging threads 25; 95. To provide the blocking opening 69 a respective axial groove 691 of semicircular cross-section is provided in both threads 25; 95 for each respective blocking opening 69, wherein the two axial grooves 691, upon thread engagement, are moved in a given relative rotational position of the two threads 25; 95, one above the other, in which position the axial grooves 691 supplement each other at least to provide a circular blocking opening 69. In that way upon assembly the two arm joints 1 are screwed together, with a spacing thereof, by way of the external connector 93 and by way of the thread engagement of the internal connector in the two central openings 24, to such an extent that the threads 25; 95 of the two openings engage into each other in play-free relationship with the lowest possible prestressing and in addition the axial grooves 691 combine to form the respective blocking opening 69 in order then in a further step to screw the screw elements 681 into the respectively associated blocking opening 69. By virtue of the same procedure, when for example play occurs in operation due to wear, the play can be eliminated, for which purpose firstly the screw elements 681 of one of the two openings 24 have to be released.

Adjustment for freedom from play of the thread engagement is thus effected step-wise, that is to say here with eight blocking elements 68, the spacing extends over a rotational angle of 45°. The accuracy with which play adjustment or freedom from play can be implemented thus depends inter alia on the number of blocking elements 68. That kind of adjustment of freedom from play in respect of a thread engagement of two interengaging threads 25; 95 is also used in other embodiments described hereinafter of the manipulator M.

Referring to FIG. 23 two arm joints 1 are rotatably connected together, constituting a rotary connection V2, with respect to the transmission axis of rotation g. The rotary connection V2 was effected here by means of a transverse connector 96. The transverse connector 96 is of a cranked shape and engages with a radially inward threaded sleeve-like end portion 961 with thread engagement radially inwardly and axially into the female thread 25 of the central opening 24 of the gear wheel 2 of the one arm joint 1, being axially non-displaceable. Here too by means of the above-described adjusting device, by way of blocking elements 68 (see FIG. 17), the thread engagement is blocked to prevent relative rotation of the threads 25, after adjusting the freedom from play. With the other radially outer end portion 962 the transverse connector 95 is connected radially outwardly and axially fixedly to the housing 3 of the other arm joint 1, that is to say, as can be seen at the screw openings 98 in FIG. 24A, being screwed, wherein the two arm joints 1 are held spaced over the axial extent of the outer end region of the transverse connector 95.

In that way the torque introduced into the transverse connector 95 by the gear wheel 2 of the one arm joint 1 can be transmitted to the housing of the other arm joint 1 so that the two arm joints 1 rotate relative to each other, upon torque transmission, with respect to the transmission axis of rotation g. In order to minimise frictional losses which occur upon relative rotation of the two arm joints 1, radially outwardly between the transverse connector 96 and the housing 3 of the one arm joint 1, the transverse connector 96 has sliding surfaces 97 which laterally axially face towards the one arm joint 1, and against which solely the one arm joint 1 bears radially outwardly at the transverse connector 96.

By way of example reference is made to FIGS. 25 and 26 to describe a further form of connection, in the form of a rotary guide means V3 for two interconnected arm joints 1. In the rotary guide means V3 two interconnected arm joints 1 are rotated relative to each other, guided against each other. That relative rotary movement however is passive, that is to say the rotary movement does not actively come from one of the two arm joints. In contrast thereto, in the case of the rotary connection V2, the rotary movement is created actively by one of the two interconnected arm joints 1. FIGS. 25A and 25B show a further embodiment of the manipulator M with three interconnected arm joints 1. For improved clarity in the Figures the arm joints 1 are additionally identified by the Roman numerals I-III. As shown in FIG. 25B the arm joint I is arranged at the right, the arm joint III is arranged at the left and the arm joint II is arranged centrally between the two arm joints I and III. As can be seen from the longitudinal sectional view here parallel to the operative axes w shown in FIG. 25A of the arm joints I-III, the rotary connection V2 already described above is provided between the arm joint I and the arm joint II, the arm joint I having a worm transmission G1 and the arm joint II having a linear transmission. In this arrangement a torque is coupled from the worm gear 2 of the arm joint I to the housing 3 of the arm joint II, whereby same is rotated relative to the arm joint I. The gear wheels 2 of the two arm joints II and I are connected non-rotatably and non-displaceably to each other by way of an internal connector 92. Therefore the gear 28 of the linear drive G3 of the arm joint II is rotated by way of the internal connector 92, wherein the gear 28 meshes at the drive output side with the toothed rack element 43 and moves linearly in the direction of the operative axis w.

There is also an external connector 93. As can be seen from FIGS. 26A and 26B, as in the case of the rotary connection V2, push-in projections 94 are provided at the drive output end while sliding surfaces 97 are provided at the drive input end. In other words the outer connector 93 is connected, in each case radially outwardly, non-rotatably to the housing 3 of the arm joint II and rotationally slidingly movably to the housing 3 of the arm joint III. When the arm joint II is actively rotated by the arm joint I then the arm joint II is at the same time rotationally slidingly movably guided at the arm joint III.

Figure 28:
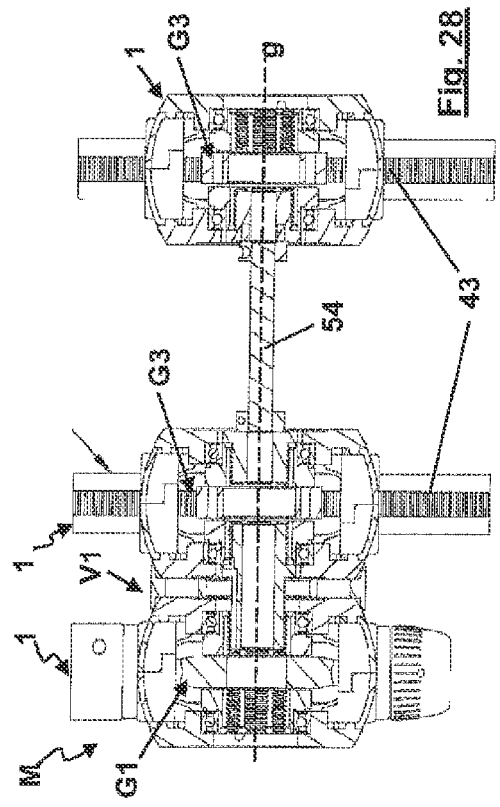
FIG. 28 shows a longitudinal sectional view in relation to FIG. 27 with an additional arm joint V rotatable parallel to the arm joint V.
Figure 29B:
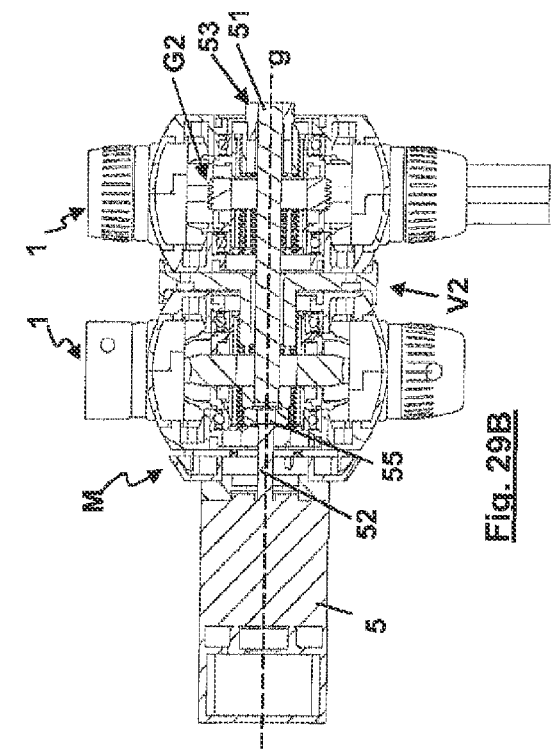
FIGS. 29A and 29B show a perspective view and a longitudinal sectional view of two rotatably interconnected arm joints I and II as shown in FIG. 25 but in addition with a motor torque-transmittingly coupled at the end.
Figure 27:
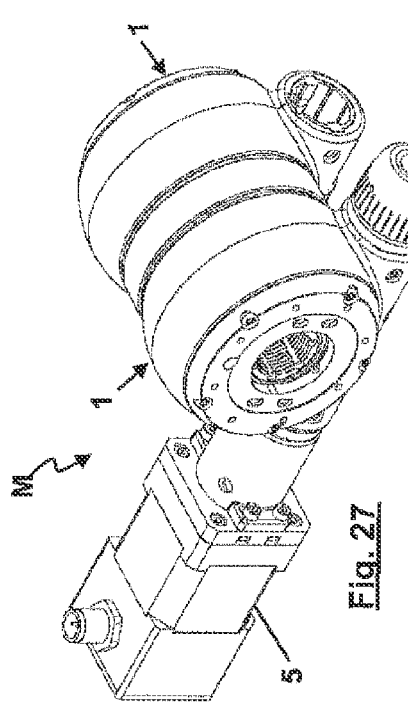
FIG. 27 shows a perspective view of two fixedly interconnected arm joints IV and V of a further embodiment of the manipulator.
Figure 29A:
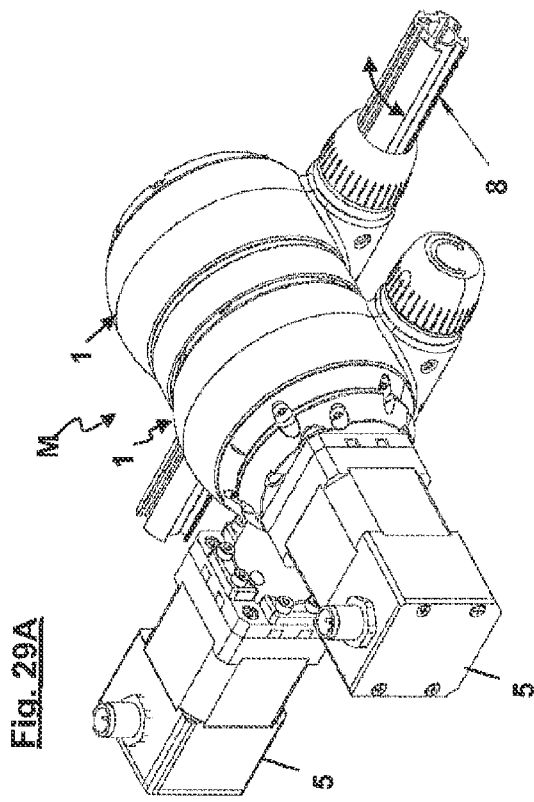

FIGS. 27-28 and 29A-29B show three further possible options for connecting arm joints 1, which are respectively driven at the drive input side by way of a worm drive G1. The two arm joints 1 shown in FIG. 27 are shown in FIG. 28 and the two arm joints I shown in FIG. 29A are shown in FIG. 29B, in each case in a longitudinal sectional view. In accordance therewith the arm joint 1 shown at the left in FIGS. 27-29 has a worm drive G1. The worm 21 of the worm drive G1 is driven by a motor 5 arranged spaced in relation to the arm joint 1. In addition the arm joint 1 adjoining the left-hand arm joint 1, as shown in FIG. 28, has a linear drive G3. The two adjacent arm joints are connected together as shown in FIG. 28 by way of a rigid connection V1 so that the torque which is coupled from the worm gear 26 of the one arm joint 1 into the spur gear 28 of the other arm joint 1 is converted by way of the linear transmission G1 into a linear movement of the toothed rack element 43.

The embodiment of the manipulator M shown in FIG. 28 has a further arm joint 1 with a linear transmission G3 arranged spaced relative to the other arm joint 1 with the linear transmission G3. For torque connection to the other arm joint 1 the arrangement has a drive shaft portion 54 bridging over the spacing. It is connected non-rotatably to the spur gears 28 of the two linear transmissions G3 so that the two linear transmissions G3 are driven synchronously by way of the worm transmission G1. The drive shaft portion 54 is mounted rotatably at both ends by way of a respective connecting element 53 at the mutually facing central openings 34 of the arm joints 1. For that purpose the connection element 53 with a male thread 27 is in play-free threaded engagement as described hereinbefore with the female thread 25 of the respectively associated central openings 34. That connection element 53 is shown by way of example in an individual view in FIGS. 18C and 18D.

The embodiment of the manipulator M shown in FIGS. 29A and 29B has a further motor 5 which is coupled with its motor shaft 52 at the end in relation to the transmission axis of rotation g to the arm joint 1 with the worm transmission G1 and is connected to the drive shaft 51 by way of a coupling 55. The drive shaft 51 passes through the arm joint 1 with the worm transmission G1 without transmitting a torque to that arm joint 1. The two interconnected arm joints 1 are supported in the central opening 24 remote from the two arm joints 1 as described above. In this case it is non-rotatably connected to the gear wheel 2 of the inverted worm drive G2. The hollow profile member 8 is thus set in rotation by way of the further motor 5.

Figure 30:
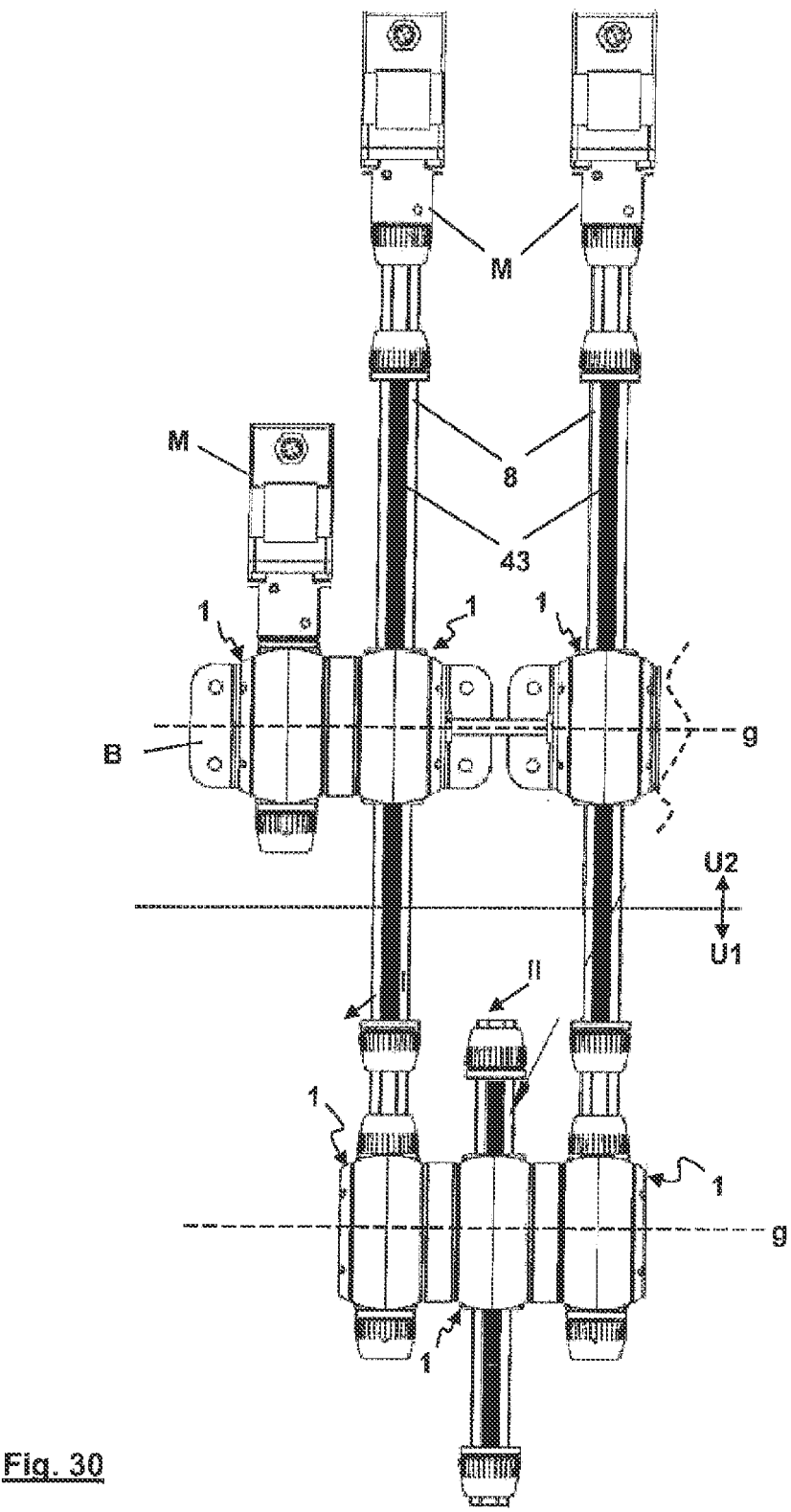
FIG. 30 shows a side view of a further embodiment of the manipulator with three arm joints as shown in FIGS. 25A and 25B and three arm joints as shown in FIG. 28.

In the embodiment of the manipulator M shown in FIG. 30 the arm joints 1 from the point of view of their functional relationship can be divided into a first group U1 and a second group U2, the first group U1 shown at the bottom in FIG. 30 already having been described with reference to FIG. 25 and the second group U2 arranged at the top in FIG. 30 already having been described more fully with reference to FIG. 28. As a departure therefrom the arm joints 1 of the second group are here mounted at a base B, wherein the arm joints 1 of the first group are arranged at the working head side of the manipulator M. In the second group the two arm joints 1 which are spaced by way of the drive shaft portion 54 and thus the associated toothed rack elements 43 which are respectively arranged in a hollow profile member 8 move parallel and synchronously. Provided at the upwardly arranged free ends of the hollow profile members 8 is a respective motor 5 which couples a torque into a drive shaft guided in the respectively associated hollow profile member and by way thereof drives the two outer joints 1 of the first group. It will be clear that extensive movement is made possible for the manipulator M by virtue of the arm joints 1.

Figure 31:
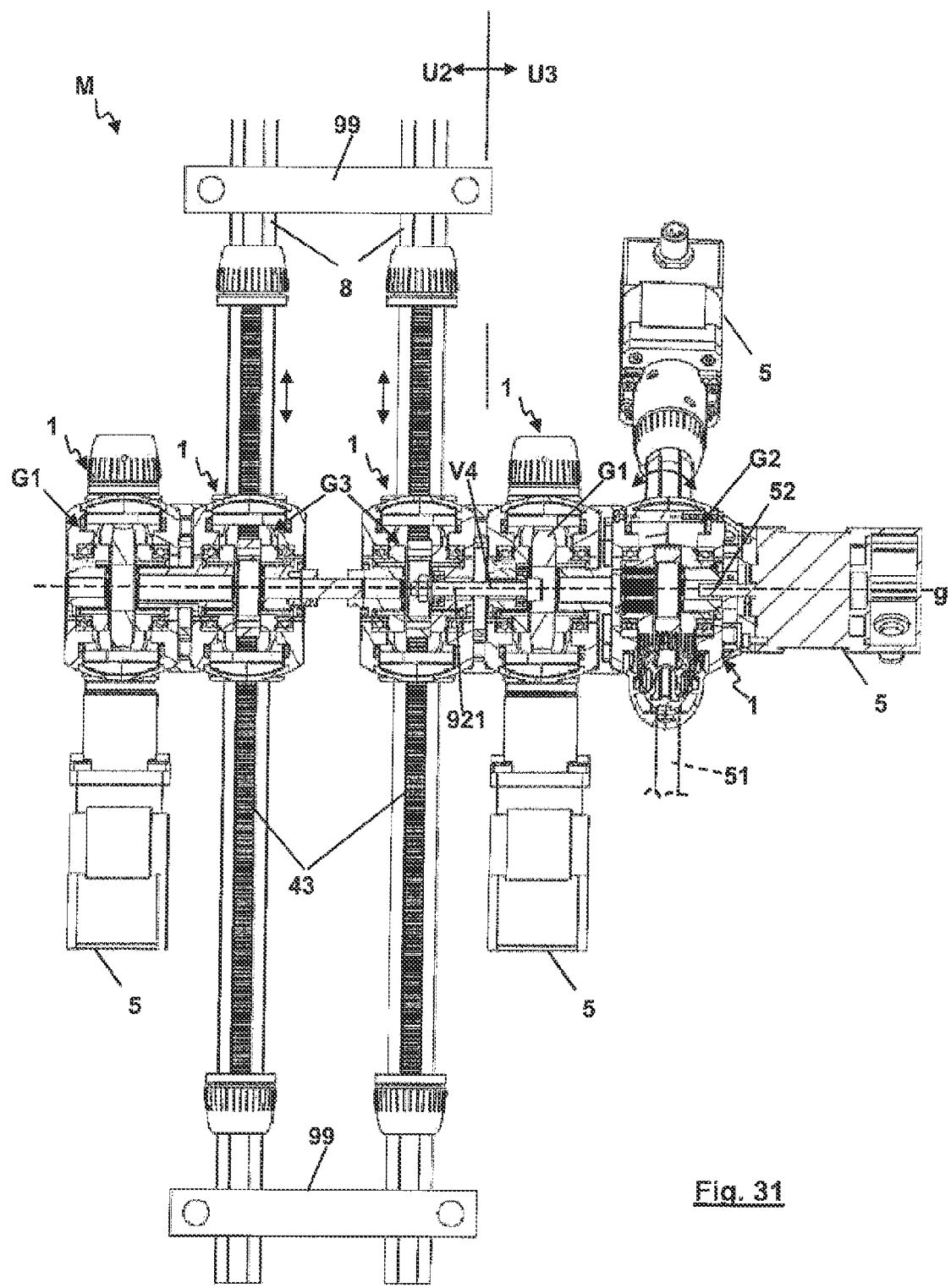
FIG. 31 shows a longitudinal sectional view of a further embodiment of the manipulator with three arm joints as shown in FIG. 28 and two arm joints as shown in FIG. 23.

In the embodiment of the manipulator M shown in FIG. 31 the arm joints 1 used can also be divided into two groups U2; U3. The one group is the already mentioned second group U2 arranged at the left in FIG. 31. As the toothed rack elements 43 respectively mounted to a hollow profile member 8 are displaced synchronously linearly being held parallel to each other, then as shown in FIG. 31 they can be fixedly connected together for stabilisation thereof by way of transverse bars 99. The arm joints 1 of both groups U2; U3 are arranged coaxially to a transmission axis of rotation g.

Between the two arm joints 1 of the other group U2 there is a rotary connection V2 which has already been described hereinbefore in relation to FIG. 23, wherein the arm joint 1 at the left in FIG. 31 drives the arm joint 1 at the left in FIG. 31. The left arm joint 1 has a worm drive G1 while the arm joint 1 at the right is equipped with an inverted worm transmission G2. The hollow profile member 8 which is passed through the right arm joint 1 is driven by way of the inverted worm transmission G2 of the right arm joint 1, which in turn is coupled at the end to a motor 5 torque-transmittingly engaging with respect to the transmission axis of rotation g. In addition coupled at the end to that hollow profile member 8 is a further motor 5 which drives a drive shaft 51 guided in the hollow profile member 8 for a purpose which is not further shown here. As the drive shaft 51 is arranged concealed in the hollow profile member 8 it is only indicated by broken lines.

Between the two arm joints 1 of the two groups U2; U3 which are directly adjacent to each other there is a further form of connection which has not yet been described, insofar as the housings 3 thereof are connected together without torque transmission non-rotatably by way of an external connector 93 and by way of a screw connection V4.

Figure 32A:
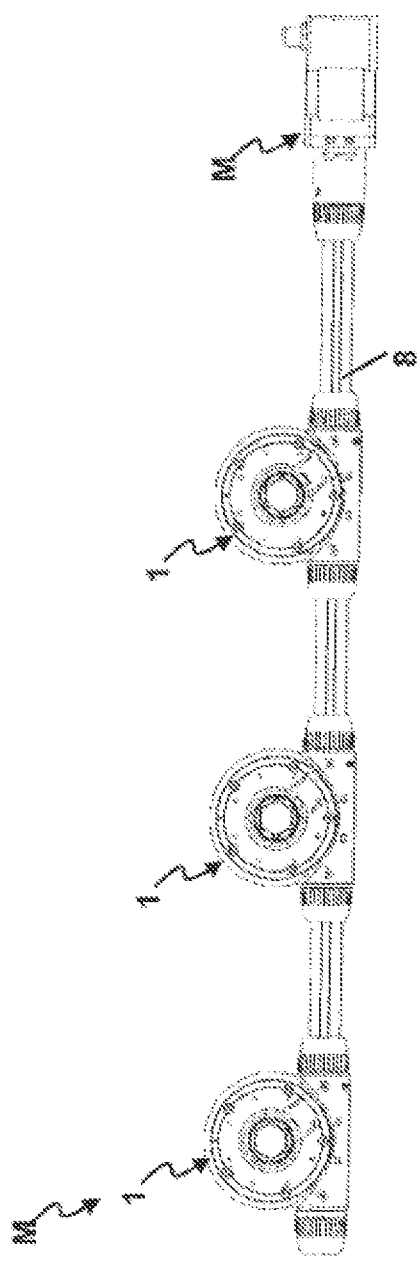
FIGS. 32A and 32B show a perspective view and a longitudinal sectional view of a further embodiment of the manipulator with three arm joints driven in succession by way of a motor.
Figure 32B:
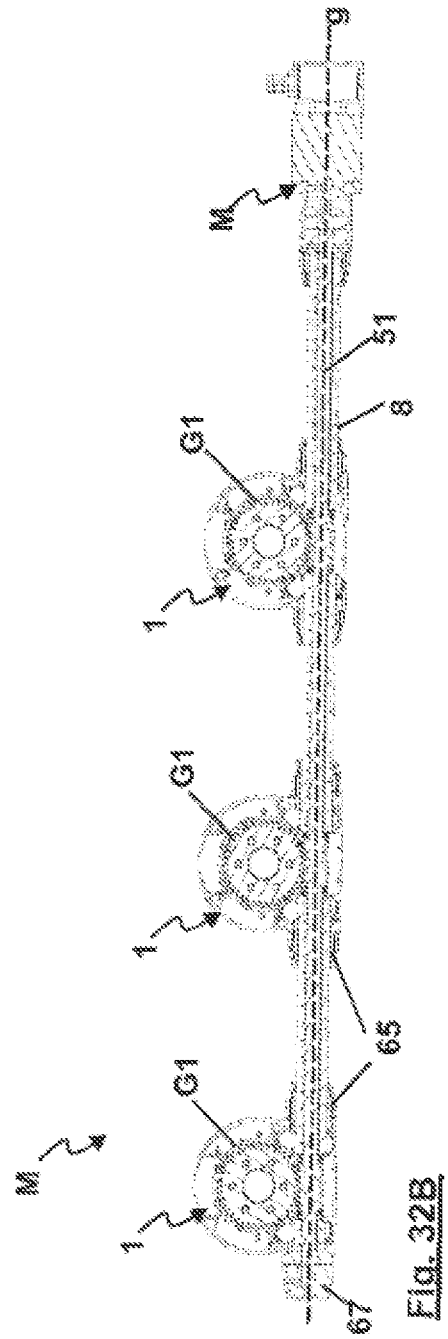

Referring to FIG. 32 the manipulator M has three arm joints 1 of substantially identical structure and arranged in succession with respect to torque transmission as indicated at 3, each having a worm transmission G1, the worms 41 of which are driven by a single drive shaft 51 passing through the arm joints 1.

The transmission components like the gear wheel 2 and the further transmission component 4 are of such a modular configuration that the arm joints 1 in all embodiments described here can be inexpensively assembled and replaced without complication. The manipulator M, the motor 5, the arm joint 1, the hollow profile member 8 and/or the components, in particular transmission components in their various modifications and sizes, are each of a modular structure and can therefore be easily assembled and replaced.

LIST OF REFERENCES 1 arm joint
2 gear wheel
21 end
22 adaptor
221 push-in projection
222 push-in opening
223 guide insert
23 side
24 opening
25 female thread
26 worm gear
261 inclined tooth arrangement
27 male thread
28 spur gear
29 external tooth arrangement
3 housing
31 receiving portion
32 cover
33 ring opening
4 further transmission element
41 worm
42 spur tooth arrangement
43 toothed rack element
44 foot
45 anchor element
5 motor
51 drive shaft
52 motor shaft
53 connection mounting
54 drive shaft portion
55 coupling
6 adjusting device
61 adjusting element
62 adjusting opening
65 clamping element
651 inner screw sleeve
652 outer screw sleeve
66 blind opening
67 setting unit
671 setting device
68 blocking element
681 screw element
69 blocking opening
691 groove
7 bearing
71 first bearing ring
72 second bearing ring
73 front bearing
74 rear bearing
8 hollow profile member
81 internal passage
82 lateral receiving groove
83 first portion
84 second portion
85 upper receiving groove
86 lower receiving groove
9 connecting device
91 parallel connector
92 internal connector
921 internal screw connection
93 external connector
94 push-in projection
95 male thread
96 transverse connector
961 inner end region
962 outer end region
97 sliding surface
98 screw opening
99 transverse bar
a spacing direction
g transmission axis of rotation
w operative axis
B base
E adjusting force
G transmission
G1 worm transmission
G2 inverted worm transmission
G3 linear transmission
M manipulator
Ma magnetic strip
R sensor means
S inclined plane
V1 rigid connection
V2 rotary connection V3 rotary guide means
V4 screw connection
U1 first group
U2 second group
U3 third group

What is claimed is:

1. An arm joint for a manipulator which has a motor, the arm joint comprising:
   a housing,
   a transmission having a transmission axis of rotation, a worm and a worm gear wheel, the worm gear wheel rotatable about the transmission axis of rotation, wherein the worm gear wheel is arranged rotatably in the housing,
   a drive shaft which is arranged non-pivotably in a plane which is perpendicular to the transmission axis of rotation,
   wherein the housing has a receiving portion to receive a further transmission element arranged transversely relative to the transmission axis of rotation and operatively connectable to a periphery of the worm gear wheel,
   wherein the further transmission element has an operative axis which is spaced in a spacing direction relative to the transmission axis of rotation and the further transmission element is mounted in or at the receiving portion of the housing,
   wherein the further transmission element comprises the worm and the drive shaft, the worm non-rotatably arranged on the drive shaft and the drive shaft rotatably mounted axially on two sides of the worm at or in the receiving portion,
   wherein the drive shaft is arranged in a hollow profile member, the hollow profile member having a first portion and a second portion spaced from each other at least over an axial extent of the worm, and
   wherein at least the first portion for adjustment of a freedom from play, which is axial with respect to a direction of the operative axis, of an engagement of the worm gear and the worm, wherein the first portion is axially moveable towards the worm by a setting unit of an adjusting device to adjust the freedom from play which is axial with respect to the direction of the operative axis.

2. The arm joint as set forth in claim 1, wherein the first portion of the hollow profile member is supported with one end at the setting unit and with an other end at a bearing which is a front bearing with respect to a direction from the setting unit towards the worm, and
   wherein the second portion of the hollow profile member is supported with one end at a further bearing which is a rear bearing with respect to the direction from the setting unit towards the worm and an other end at the receiving portion by a clamping element.

3. The arm joint as set forth in claim 2, wherein the setting unit has a blind opening which is axial with respect to the operative axis and into which the drive shaft is rotatably in projecting relationship with a free end, wherein the setting unit at the end of the first portion of the hollow profile member is arranged on the receiving portion screwable axially in the direction towards the worm.

4. The arm joint as set forth in claim 1, wherein the setting unit has a blind opening which is axial with respect to the operative axis and into which the drive shaft is rotatably in projecting relationship with a free end, wherein the setting unit at the end of the first portion of the hollow profile member is arranged on the receiving portion screwable axially in the direction towards the worm.

5. A manipulator comprising at least one arm joint as set forth in claim 1.

6. The manipulator as set forth in claim 5, wherein the at least one arm joint comprises at least two arm joints, wherein the at least two arm joints are force-lockingly, motion-lockingly and/or guidance-operatively connected together by a connecting device in a connecting position.

7. The manipulator as set forth in claim 6, wherein the at least two arm joints are arranged in mutually coaxially aligned relationship with respect to the transmission axis of rotation, wherein mutually facing ends respectively have an opening which is central relative to the transmission axis of rotation.

8. The manipulator as set forth in claim 6, wherein in a connecting position the at least two arm joints are arranged coaxially with the transmission axis of rotation and in mutually spaced relationship parallel with respect to a plane perpendicular to the transmission axis of rotation by a connecting device having parallel connectors.

9. The manipulator as set forth in claim 8, wherein each of the two arm joints has a respective axis of rotation and a respective housing, and wherein the two arm joints are fixedly connected together by the transmission axes of rotation of the two arm joints being respectively non-rotatably connected together by a radially inwardly disposed parallel connector, which is an internal connector, and the housings of the two arm joints are respectively non-rotatably connected together by a radially outward parallel connector, which is an external connector.

10. The manipulator as set forth in claim 8, wherein each of the two arm joints has a respective housing, and wherein the two arm joints are connected together rotatably by a parallel connector which extends transversely relative to the transmission axis of rotation and which is a transverse connector, wherein the transverse connector is connected with a radially inwardly disposed end portion non-rotatably to the transmission axis of rotation of one of the two arm joints and further with a radially outwardly disposed end portion in sliding or rolling relationship to the housing of the one arm joint and fixedly to the housing of the other arm joint.

11. The manipulator as set forth in claim 8, wherein each of the two arm joints has a respective axis of rotation and a respective housing, and wherein the two arm joints are connected to constitute a rotary guide of the one arm joint at the other arm joint by the transmission axes of rotation of the two arm joints being fixedly connected by a radially inwardly disposed parallel connector, which is an internal connector, and by the housings of the two arm joints being connected by a radially outward parallel connector, which is an external connector, wherein the external connector is connected non-rotatably to the housing of the one arm joint and slidingly or rollingly to the housing of the other arm joint.

12. The manipulator as set forth in claim 5, wherein a parallel connector is adapted in a connecting position to engage in torque-transmitting relationship into a central opening, for engagement, the parallel connector having an end portion with which the parallel connector in the connecting position engages into the central opening.

13. The manipulator as set forth in claim 12, wherein for play-free engagement of the central opening and the end portion there is provided at least one blocking element, wherein the blocking element is introduced axially with respect to the transmission axis of rotation between the central opening and the end portion.

14. The manipulator as set forth in claim 5, wherein the arm joint and a motor associated with the arm joint are arranged in mutually spaced relationship.

15. The manipulator as set forth in claim 5, wherein the manipulator is of a modular structure and is assemblable from individual modules in accordance with a modular principle.

16. The arm joint as set forth in claim 1, wherein the transmission axis of rotation and the operative axis are arranged parallel to a plane which extends perpendicularly to a spacing, extending in the spacing direction, between the operative axis and the transmission axis of rotation, wherein the worm gear wheel and the further transmission element are movable relative to each other in the spacing direction to adjust a freedom from play which is axial with respect to the spacing direction.

17. The arm joint as set forth in claim 16, wherein a bearing for the worm gear wheel has a first bearing ring associated with the housing and a second bearing ring associated with the worm gear wheel and an adjustment of the freedom from play which is axial with respect to the spacing direction is effected by an inclined plane which is operative in the spacing direction and by which an adjusting force is couplable into the first bearing ring in a direction from the gear wheel towards the further transmission element.

18. The arm joint as set forth in claim 17, wherein for the adjustment of the freedom from play which is axial with respect to the spacing direction there is provided an adjusting element which is mounted movably to the housing transversely relative to the spacing direction and which slides on the inclined plane with production of the adjusting force.

19. The arm joint as set forth in claim 18, wherein the adjusting element comprises a screw bolt with a conical working end, with which the screw bolt slides transversely relative to the spacing direction at the inclined plane provided at the first bearing ring.

* * * * *